(12) United States Patent
Narine et al.

(10) Patent No.: US 9,611,352 B2
(45) Date of Patent: Apr. 4, 2017

(54) SYNTHESIS AND MOLECULAR WEIGHT CONTROL OF ALIPHATIC POLYESTER DIOLS

(71) Applicant: Trent University, Peterborough (CA)

(72) Inventors: Suresh Narine, Peterborough (CA); Shaojun Li, Peterborough (CA); Jesmy Jose, Peterborough (CA); Shegufta Shetranjiwalla, Peterborough (CA); Laziz Bouzidi, Peterborough (CA)

(73) Assignee: Trent University, Peterborough, Ontario (CA)

( * ) Notice: Subject to any disclaimer, the term of this patent is extended or adjusted under 35 U.S.C. 154(b) by 0 days.

(21) Appl. No.: 14/854,840

(22) Filed: Sep. 15, 2015

(65) Prior Publication Data

US 2016/0075820 A1    Mar. 17, 2016

Related U.S. Application Data

(60) Provisional application No. 62/051,740, filed on Sep. 17, 2014.

(51) Int. Cl.
| | | |
|---|---|---|
| *C08G 63/02* | (2006.01) | |
| *C08G 63/16* | (2006.01) | |
| *C08G 63/78* | (2006.01) | |
| *C08G 63/90* | (2006.01) | |

(52) U.S. Cl.
CPC ............ *C08G 63/16* (2013.01); *C08G 63/78* (2013.01); *C08G 63/90* (2013.01)

(58) Field of Classification Search
CPC ....................................................... C08G 63/16
USPC ........................................ 528/271, 272, 279
See application file for complete search history.

(56) References Cited

U.S. PATENT DOCUMENTS

5,786,408 A * 7/1998 Kuroda .................. C08L 67/02
428/395
2011/0306734 A1    12/2011 Brauer et al.

FOREIGN PATENT DOCUMENTS

CA        2161824        5/1996

OTHER PUBLICATIONS

Del Valle, et al., "Biodegradable Polyesters Reinforced with Triclosan Loaded Polylactide Micro/Nanofibers: Properties, Release and Biocompatibility", eXPRESS Polymer Letters, 2012, 6(4): 266-282.

* cited by examiner

*Primary Examiner* — Terressa Boykin
(74) *Attorney, Agent, or Firm* — Bereskin & Parr LLP/S.E.N.C.R.L., s.r.l.; Michael Fenwick

(57) ABSTRACT

The synthesis of certain polyester diols (PEDs) is disclosed. This application also discloses the purification and polymerization kinetics of lipid based PEDs. Molecular weight and distribution controls were achieved by initial and induced stoichiometric imbalance and optimization of the purification protocol. Thermal degradation and thermal transition behavior of the PEDs were also investigated by TGA and DSC.

20 Claims, 18 Drawing Sheets

SYNTHESIS AND MOLECULAR WEIGHT CONTROL OF ALIPHATIC POLYESTER DIOLS

CROSS REFERENCE TO RELATED APPLICATIONS

A claim of priority for this application under 35 U.S.C. §119(e) is hereby made to U.S. Provisional Patent Application No. 62/051,740 filed Sep. 17, 2014; and this application is incorporated herein by reference in its entirety.

TECHNICAL FIELD

This application relates to the synthesis and molecular weight control of lipid derived aliphatic polyester diols, which serve as monomers for thermoplastic polyester urethanes.

BACKGROUND

Growing concerns over the environmental impacts of non-biodegradable plastic waste and the need for sustainability have stimulated research efforts on biodegradable polymers from renewable resources. Rising costs and dwindling petrochemical feedstocks also make renewable resource-based materials attractive alternatives to their petroleum-based counterparts. Many of these efforts have concerned ester containing polymers such as polyesters, polyester amides, and polyester urethanes, where the polar ester groups (—COO—) offer biodegradability through hydrolytic and/or enzymatic degradation, and hydrophobicity through the long aliphatic segments. Aliphatic polyesters have applications in biomedical applications, packaging applications, and in the coating industry. The polyesters are monomers in the production of reprocessable polymers like thermoplastic polyester urethanes (TPEU)s. Although currently produced from depleting petrochemical resources, ingredients sourced from renewable feedstocks, such as natural oils, are increasingly used to develop such materials. In particular, TPEU elastomers made with aliphatic polyester segments have been shown to be biodegradable.

The control of the molecular weight of the polyesters is important as it determines the crystalline structure, further affecting mechanical and thermal properties of lipid derived TPEUs for a large part. In the particular case of polyester diols (PEDs, Scheme 1), used for the synthesis of TPEU elastomers, molecular weights between 1000 and 5000 gmol$^{-1}$ are common.

Since the degree of polymerization is a function of reaction time, a specific molecular weight can be obtained by cooling the reaction at a suitable time. However, the polyesters obtained in this way will possess end-groups that can further react with each other, affecting polymer molecular weight. This situation can be resolved by operating under stoichiometric imbalance conditions in which one of the two reacting monomers is kept in excess, resulting in polymers with the same end-groups, terminating the polycondensation. In the case of the synthesis of PEDs, the diol is kept in excess and the polyesterification reaches a point where the deficient monomer (the diacid) is entirely reacted and the chain ends of the formed polymer is alcohol terminated, preventing further polymerization.

The rate of formation of linear polyesters is complicated by competing effect of side reactions such as intra-molecular cyclization due to the reaction of a terminal hydroxyl group with an internal ester group and/or terminal carboxylic acid of the same chain. Also, breakdown of polymeric PEDs caused by the alcoholysis of polyester groups of one chain by the terminal hydroxyl group of another chain occurs. The kinetics of polymerization of PEDs synthesized from unequal diacid and diol concentrations provides an indication of the impact of stoichiometric imbalance on molecular weight growth.

Polyesterification is a step polymerization reaction in which molecular weight increases slowly and takes long times to complete. It also promotes unavoidable volatilization of the monomers or precipitation of the polymer segments and the formation of low molecular weight volatile or cyclic oligomers, impacting the molecular weight and polydispersity index (PDI) of the polyester. The effective removal of the undesirable products is relevant to improving final TPEU properties. Some of the impurities can be removed by volatilization under vacuum at high temperature during the reaction, by column chromatography or fractional precipitation after the reaction. The latter is the most effective way for homogenizing molecular weight distribution based on the discriminatory solvent solubility of polymer chains.

Scheme 1. Polyester diol with terminal hydroxyl groups. R and R' represent hydrocarbon chains from monomer diols and dicarboxylic acids, respectively.

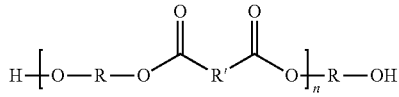

The present effort describes the synthesis, purification and polymerization kinetics of lipid based PEDs. Molecular weight and distribution controls were achieved by initial and induced stoichiometric imbalance and optimization of the purification protocol. Thermal degradation and thermal transition behavior of the PEDs were investigated by TGA and DSC, respectively.

DETAILED DESCRIPTION

Figure 1:
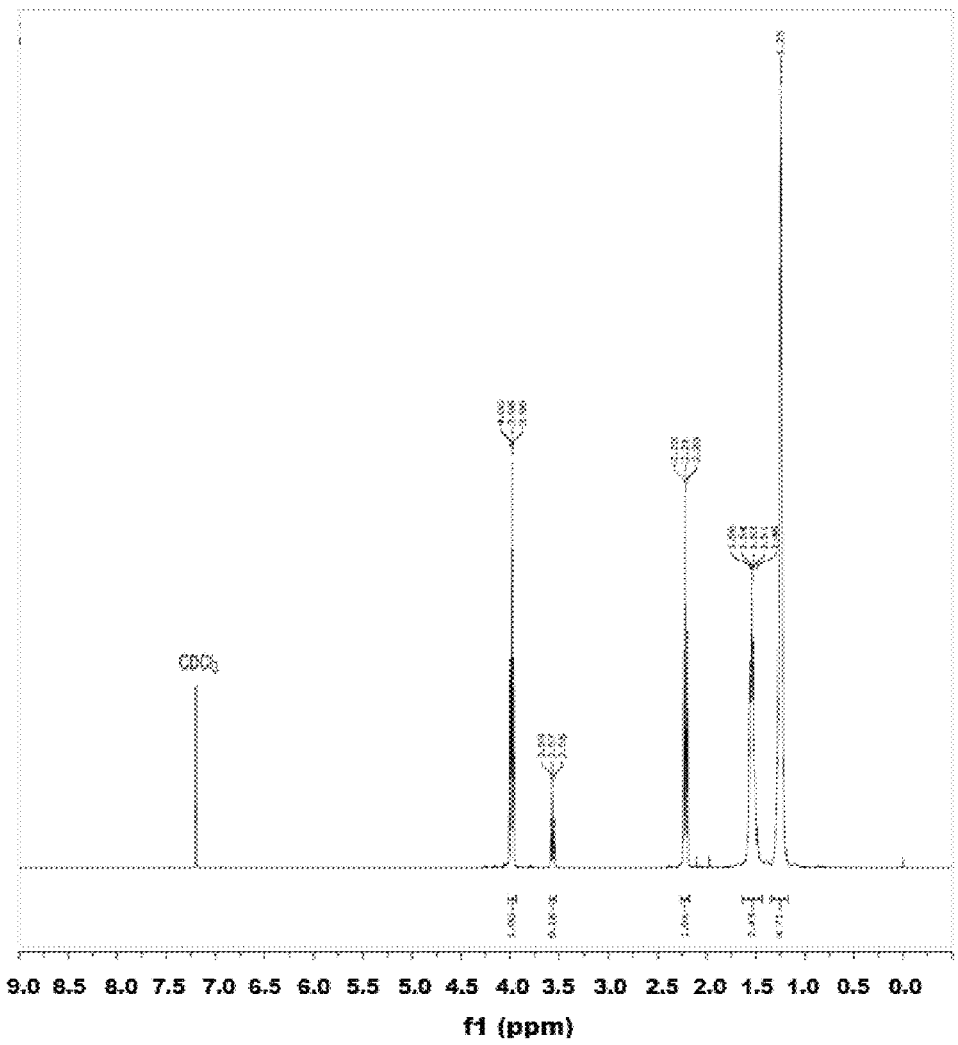
FIG. 1 depicts a $^{1}$H-NMR spectra of PED0.8.

The synthesis of certain polyester diols (PEDs) were prepared from the following materials: (i) an organic dicarboxylic acid and (ii) a diol component.

The organic dicarboxylic acid may include, as a non-limiting example, aliphatic, cycloaliphatic or aromatic diacids having from about 2 to about 20 carbon atoms. These diacids can be either saturated or unsaturated. Such diacids include, but are not limited to, adipic acid, terephthalic acid, oxalic acid, succinic acid, sebacic acid, fumaric acid, azelaic acid, suberic acid, phthalic acid, isophthalic acid, hexahydrophthalic acid, succinic anhydride, phthalic anhydride or any combination thereof, and the like. At times, the organic dicarboxylic acid is an aliphatic dicarboxylic acid such as azelaic acid.

The diol component may include, as a non-limiting example, aliphatic, cycloaliphatic or aromatic diols which can be either saturated or unsaturated. These diols can have from 2 to about 20, at times from about 2 to about 12, and at times from 2 to about 8, carbon atoms per molecule. Such diols include, but are not limited to, ethylene glycol, propylene glycol, 1,4-butanediol, 1,3-butanediol, 1,2-butanediol, pentanediol, heptanediol, neopentyl glycol, 1,3-propanediol, 1,6-hexanediol, 1,9-nonanediol, decanediol, 2,2,4-trimethyl-1,3-pentanediol, diethylene glycol, dipropylene glycol, cyclohexanedimethanol, 2-methyl-1,3-propanediol or any combination thereof and the like. At times, the diol component is 1,9-nonanediol.

In some aspects, the organic dicarboxylic acid and the diol component may be derived from a natural oil. As used herein, the term "natural oil" may refer to oil derived from plants or animal sources. The term "natural oil" includes natural oil derivatives, unless otherwise indicated. Examples of natural oils include, but are not limited to, vegetable oils, algal oils, animal fats, tall oils, derivatives of these oils, combinations of any of these oils, and the like. Representative non-limiting examples of vegetable oils include canola oil, rapeseed oil, coconut oil, corn oil, cottonseed oil, jojoba oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal fats include lard, tallow, poultry fat, yellow grease, and fish oil. Tall oils are by-products of wood pulp manufacture. In certain aspects, the natural oil may be refined, bleached, and/or deodorized. In some aspects, the natural oil may be partially or fully hydrogenated. In some aspects, the natural oil is present individually or as mixtures thereof.

Natural oils may include triacylglycerols of saturated and unsaturated fatty acids. Suitable fatty acids may be saturated or unsaturated (monounsaturated or polyunsaturated) fatty acids, and may have carbon chain lengths of 3 to 36 carbon atoms. Such saturated or unsaturated fatty acids may be aliphatic, aromatic, saturated, unsaturated, straight chain or branched, substituted or unsubstituted and mono-, di-, tri-, and/or poly-acid variants, hydroxy-substituted variants, aliphatic, cyclic, alicyclic, aromatic, branched, aliphatic- and alicyclic-substituted aromatic, aromatic-substituted aliphatic and alicyclic groups, and heteroatom substituted variants thereof. Any unsaturation may be present at any suitable isomer position along the carbon chain as would be noted to a person skilled in the art.

Some non-limiting examples of saturated fatty acids include propionic, butyric, valeric, caproic, enanthic, caprylic, pelargonic, capric, undecylic, lauric, tridecylic, myristic, pentadecanoic, palmitic, margaric, stearic, nonadecyclic, arachidic, heneicosylic, behenic, tricosylic, lignoceric, pentacoyslic, cerotic, heptacosylic, carboceric, montanic, nonacosylic, melissic, lacceroic, psyllic, geddic, ceroplastic acids.

Some non-limiting examples of unsaturated fatty acids include butenoic, pentenoic, hexenoic, pentenoic, octenoic, nonenoic acid, decenoic acid, undecenoic acid, dodecenoic acid, tridecenoic, tetradecenoic, pentadecenoic, palmitoleic, palmitelaidic, oleic, ricinoleic, vaccenic, linoleic, linolenic, elaidic, eicosapentaenoic, behenic and erucic acids. Some unsaturated fatty acids may be monounsaturated, diunsaturated, triunsaturated, tetraunsaturated or otherwise polyunsaturated, including any omega unsaturated fatty acids.

In particular, the organic dicarboxylic acid is azelaic acid, and the diol component is 1,9-nonanediol. A non-limiting example of a process for producing 1,9-nonanediol would comprise subjecting oleic acid to ozonolysis, esterifying the resulting azelaic acid and subjecting the azelaic acid ester to reduction with a suitable reducing agent, such as lithium aluminum hydride. The oleic acid is derived from a natural oil, and by extension via the preceding process, the azelaic acid and 1,9-nonanediol are derived from a natural oil.

As needed for the PED synthesis, a suitable solvent may be used. Commonly used solvents may be chosen from the group including but not limited to aliphatic hydrocarbons (e.g., hexane and cyclohexane), organic esters (e.g., ethyl acetate), aromatic hydrocarbons (e.g., benzene and toluene), ethers (e.g., dioxane, tetrahydrofuran, ethyl ether, tert-butyl methyl ether), halogenated hydrocarbons (e.g., dicholoromethane and chloroform), and other solvents (e.g., N,N-dimethylformamide (DMF), dimethyl sulfoxide (DMSO)).

As needed for the PED synthesis, a suitable catalyst may be used. The catalyst component may include tertiary amines, organometallic derivatives or salts of, bismuth, tin, iron, antimony, cobalt, thorium, aluminum, zinc, nickel, cerium, molybdenum, titanium, vanadium, copper, manganese and zirconium, metal hydroxides and metal carboxylates. Tertiary amines may include, but are not limited to, triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine. Suitable organometallic derivatives include di-n-butyl tin bis(mercaptoacetic acid isooctyl ester), dimethyl tin dilaurate, dibutyl tin dilaurate, dibutyl tin sulfide, stannous octoate, lead octoate, ferric acetylacetonate, titanium isopropoxide or titanium butoxide. Metal hydroxides may include sodium hydroxide and metal carboxylates may include potassium acetate, sodium acetate or potassium 2-ethylhexanoate.

Analytical Characterization Techniques of PEDs

Gel Permeation Chromatography (GPC) was used to determine the molecular weight and molecular weight distribution of the PEDs. GPC tests were carried out on a Waters Alliance e2695 separation module (Milford, Mass., USA), equipped with a Waters 2414 refractive index detector and a Styragel HR5E column (5 mm). Chloroform was used as the eluent with a flow rate of 0.5 mL/min. The concentration of the sample was 2 mg/mL, and the injection volume was 30 mL. Polystyrene standards (PS, #140) were used to calibrate the curve.

Proton nuclear magnetic resonance, $^1$H-NMR, spectra were recorded on a Bruker Advance III 400 spectrometer (Bruker BioSpin MRI GmbH, Karlsruhe, Germany) at a frequency of 400 MHz, using a 5-mm BBO probe. The spectra were acquired at 25° C. over a 16-ppm window with a 1-s recycle delay, 32 transients. Spectra were Fourier transformed, phase corrected, and baseline corrected. Window functions were not applied prior to Fourier transformation. Chemical shifts were referenced relative to a residual solvent peak (CDCl$_3$, δ(1H)=7.26 ppm). Fourier transform infrared spectroscopy (FTIR) spectra were acquired on a Thermo Scientific Nicolet 380 spectrometer (Thermo Electron Scientific Instruments, LLC, USA.) equipped with a PIKE MIRacle™ attenuated total reflectance (ATR) system (PIKE Technologies, Madison, Wis., USA.). The sample for FTIR testing was placed onto the ATR crystal area and held in place by the pressure arm. The spectrum was acquired in the scanning range of 400-4000 cm$^{-1}$ using 256 scans at a resolution of 4 wavenumbers. Sample gain was 8.0, mirror velocity was 0.6329 and aperture was 100.

Differential scanning calorimetry (DSC) measurements were carried out on a Q200 model DSC (TA instrument, Newcastle, Del., USA) under a dry nitrogen gas atmosphere following the ASTM D3418 standard. The sample (5.0-6.0 (±0.3) mg), contained in a hermetically sealed aluminum pan was first heated to 110° C. (referred to as the 1$^{st}$ heating cycle), held at that temperature for 5 min to erase thermal history, then cooled down to −50° C. at 5° C./min. The sample was subsequently heated to 160° C. at 3° C./min (referred to as the 2$^{nd}$ heating cycle).

Thermogravimetric analysis (TGA) was carried out on a Q500 TGA model (TA instrument, Newcastle, Del., USA). Approximately 8.0-15.0 mg of sample loaded in an open TGA platinum pan was equilibrated at 25° C. and heated to 600° C. at 10° C./min. The measurements were performed under dry nitrogen of 40 mL/min for balance purge flow and 60 mL/min for sample purge flow.

Synthesis of PEDs

Materials

Azelaic acid (AA) (85%), 1,9-nonanediol (NDO) (98%), titanium (IV) butoxide (98%), hexanes, ethyl acetate, chloroform (99.8%), HPLC grade chloroform and methanol (99.8%) were purchased from Sigma Aldrich (Oakville, ON). Note that AA can be prepared by ozonolysis and oxidation of oleic acid and NDO by the reduction of AA as previously reported. AA was recrystallized from distilled water to a purity of 97%, as ascertained by gas chromatography, before use.

Synthesis Procedure

The PEDs were synthesized by step growth polycondensation of azelaic acid (AA) and 1,9-nonanediol (NDO) in the presence of titanium (IV) butoxide as catalyst (Scheme 2). Number average molecular weight ($M_n$) ranging between 1000 and 5000 gmol$^{-1}$, suitable as monomers for poly(ester urethane)s, was targeted and achieved using two synthetic routes (referred to in the following as Route 1 and Route 2), both under stoichiometric imbalance conditions with NDO in excess of AA. In both routes, the polymerization reaction was set up in a three necked 250 mL flask connected to a condenser, a thermometer and a vacuum outlet. The reaction mixture was kept in a silicone oil bath and stirred using a Teflon coated magnetic stir bar. The apparatus was heated using a magnetic hotplate. The diacid, diol and catalyst were bulk added to the flask and heated to melt (110° C.) and the esterification reaction was carried out between about 120° C. and 200° C., and at times at 150° C.

In Route 1, the initial monomer stoichiometry was fixed and the reaction was monitored for up to 30 h, and at times from between 11 h and 30 h. Route 2 was an optimization of Route 1 where polymerization in an initially imbalanced reaction is arrested at a selected time ($t_E$) by end-capping PED oligomers with hydroxyl groups in order to produce specific desired low molecular weight PEDs with narrow distribution profiles. This was achieved by adding an extra controlled amount of NDO at $t_E$ during the reaction, i.e., inducing a secondary stoichiometric imbalance. The PEDs produced via both routes were purified using an optimized fractional precipitation method. Stoichiometric imbalance was defined as the ratio, r, of the acid (AA) to alcohol (NDO) monomers. Because NDO was in excess, r is smaller than unity.

Table 1 lists the nomenclature and reaction parameters used in the PED synthesis. The PEDs were coded based on the initial stoichiometric imbalance 'r' values and time of induced imbalance. For example, PED0.8 represents the reaction with initial r=0.8, or AA: NDO molar ratio 1:1.25, and labels also the produced PED, and PED0.8-*a* (b, c or d), represents the reaction with initial r=0.8 and induced imbalance at 1 h (3, 5 or 7 h) and labels also the produced PED (Table 1).

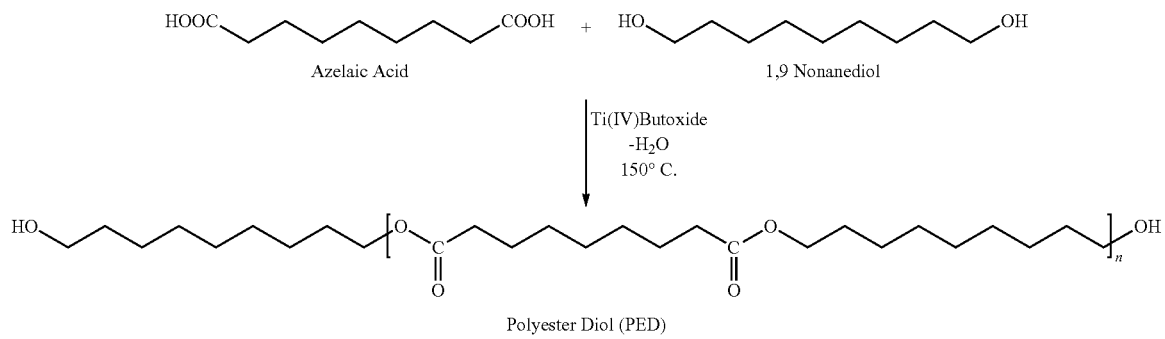

Scheme 2. Synthesis of polyester diols.

TABLE 1

Synthesis and purification parameters for PEDs obtained from Route 1 and Route 2.

| PEDs | IMR | r | $t_{Total}$ (h) | $t_E$ (h) | M:C |
|---|---|---|---|---|---|
| Route 1 | | | | | |
| PED0.9 | 1:1.10 | 0.91 | 30 | 0 | 10:1 |
| PED0.8 | 1:1.25 | 0.80 | 30 | 0 | 10:1 |
| PED0.7 | 1:1.50 | 0.67 | 30 | 0 | 10:1 |
| PED0.6 | 1:1.75 | 0.57 | 30 | 0 | 10:1 |
| Route 2 | | | | | |
| PED0.8-a | 1:1.25 | 0.8 | 5 | 1 | 15:1 |
| PED0.8-b | 1:1.25 | 0.8 | 7 | 3 | 15:1 |
| PED0.8-c | 1:1.25 | 0.8 | 9 | 5 | 15:1 |
| PED0.8-d | 1:1.25 | 0.8 | 11 | 7 | 15:1 |

IMR = initial molar ratio of azelaic acid to 1,9-nonanediol (AA:NDO),
r = stoichiometric imbalance,
$t_{Total}$ (h) = total reaction time,
$t_E$ (h) = time at which extra NDO was added,
M:C = methanol:chloroform ratio used for purification.

Synthesis of PEDs Using Route 1

Four reactions each using a different initial AA to NDO ratio (AA: NDO from 1:1.05 to 1.2, including 1:1.10, 1:1.25, 1:1.5 and 1:1.75, i.e., r=0.9, 0.8, 0.7 and 0.6, respectively) were conducted following Route 1. In each reaction, 50 mmol (9.6 g) of AA was reacted with NDO in excess to achieve the desired stoichiometric ratio. 0.0016 mmol (0.160 g) of catalyst was used for each mmol of NDO. The reaction was conducted under constant stirring (550 rpm) and reduced pressure of 300 Torr. The procedure facilitated the removal of the produced water, as evidenced by careful mass balance calculations. Molecular weight and PDI of PEDs were measured using GPC every hour for the first thirteen hours (13 h) of reaction, and at the thirtieth hour (30 h).

Synthesis of PEDs Using Route 2

Four reactions were conducted using Route 2. Each reaction started with 16 mmol (3.06 g) of AA and 20 mmol (3.27 g) of NDO (i.e., an initial imbalance AA to NDO ratio of 1:1.25 or r=0.8) in the presence of 0.032 mmol (0.011 g) of catalyst, then a fixed amount of extra NDO, 4 mmol (0.64 g), and catalyst (0.0022 g) was added to the reaction at a selected time ($t_E$=1, 3, 5 or 7 h, a, b, c and d, respectively, in Table 1). The reactions were conducted at 150° C. under constant stirring at 550 rpm. In contrast with Route 1, an inert atmosphere ($N_2$ gas) was used at selected stages of the reaction, and vacuum (300 Torr) was applied only when the $N_2$ supply was discontinued. $N_2$ atmosphere was supplied for an hour after the initial stoichiometric imbalance, i.e., the first hour of reaction and during an hour following the induced stoichiometric imbalance. The reaction mixture was terminated four hours after the induced stoichiometric imbalance by removing the reaction system from the oil bath to room temperature. Molecular weight and PDI of the PEDs were measured every hour with GPC.

Purification of PEDs

The crude PEDs from both routes were purified by fractional precipitation. PED (20 g) was dissolved in 100 mL of chloroform and precipitated in methanol. The low molecular weight alcohols remained in solution while larger diols were precipitated out. The optimum ratio of chloroform to methanol was determined for both routes by systematically varying ratios of the PED solution in chloroform with excess methanol until all impurities were consistently removed in a single step and PEDs achieved a target PDI of less than 2. The larger diols close to the target were procured by purification of PEDs of Route 1 with methanol: chloroform ratio of 10:1 (v/v), and PEDs of Route 2 with methanol: chloroform ratio of 15:1 (v/v).

Experimental Results and Discussion

Structural Characterization of PEDs

Structure of PEDs was confirmed with $^1$H-NMR and FTIR. $^1$H-NMR of PED0.8, representative of the PEDs, is shown in FIG. 1. Chemical shifts characteristic of methylene groups adjacent to the oxygen and carbonyl in the ester groups ($CH_2O$, 4.03 ppm and $CH_2C=O$, 2.23 ppm), confirmed the formation of the polyester linkage, and that of hydroxyl groups ($CH_2OH$, 3.65 ppm) confirms the existence of hydroxyl groups. The absence of the chemical shift near 11 ppm characteristic of the carboxylic group proton indicates that the sample is free of residual acid.

Figure 2:
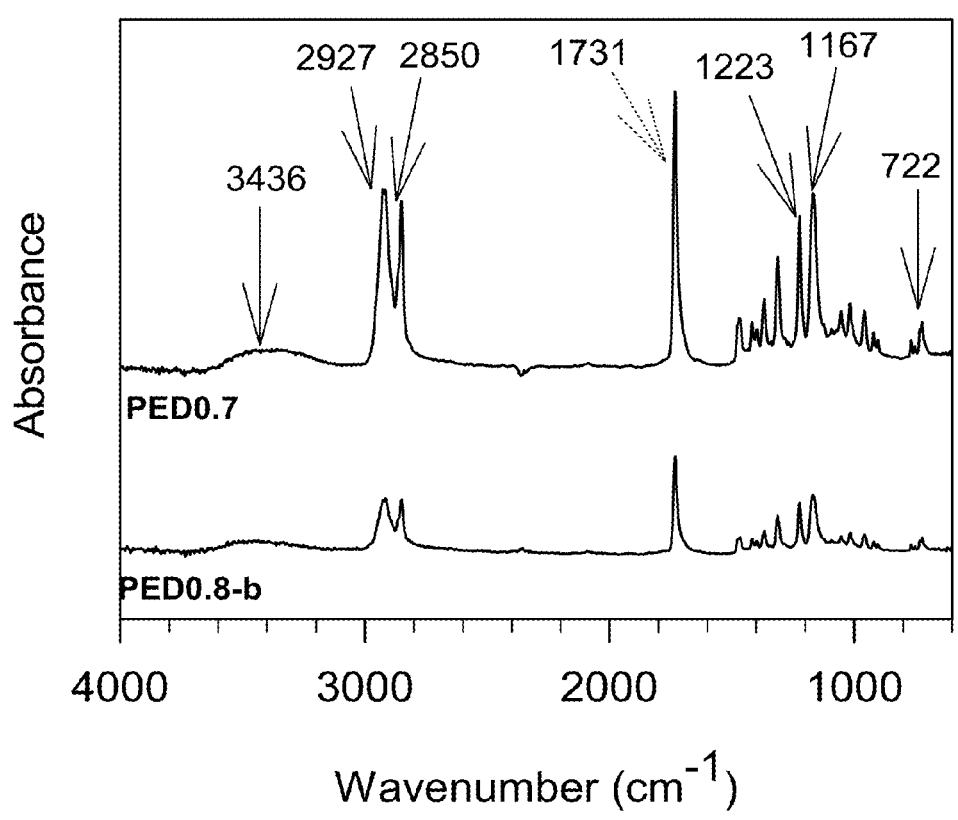
FIG. 2 depicts a FTIR spectra of PED0.7 and PED0.8-b of PEDs prepared from Route 1 and Route 2.

FTIR spectra of purified PED0.7 and PED0.8-b, representative of PEDs from Route 1 and Route 2, respectively, are presented in FIG. 2. A strong peak at 1731 $cm^{-1}$ characteristic of the C=O stretch of esters showed for all PEDs confirming the formation of esters. The peaks of the aliphatic C—O stretching at 1223 $cm^{-1}$ and 1167 $cm^{-1}$ and the peaks of the aliphatic C—H bend between 722 $cm^{-1}$ and 920 $cm^{-1}$ in the fingerprint region also confirm the presence of polyester chains. The broad band centered at 3436 $cm^{-1}$ is characteristic of the —OH stretch in alcohols. The span of the this peak beyond 3300 $cm^{-1}$, which is characteristic of carboxylic acid group, and the presence of strong peaks at 2927 $cm^{-1}$ and 2851 $cm^{-1}$, characteristic of the aliphatic methylene groups stretch, suggest that the samples are all hydroxyl terminated. The absence of the characteristic C=O stretch of carboxylic acids near 1600 cm$^{-1}$ in the FTIR spectra indicates that the PEDs do not have acid terminated chains.

Molecular Weight Control of PEDs

Figure 3A:
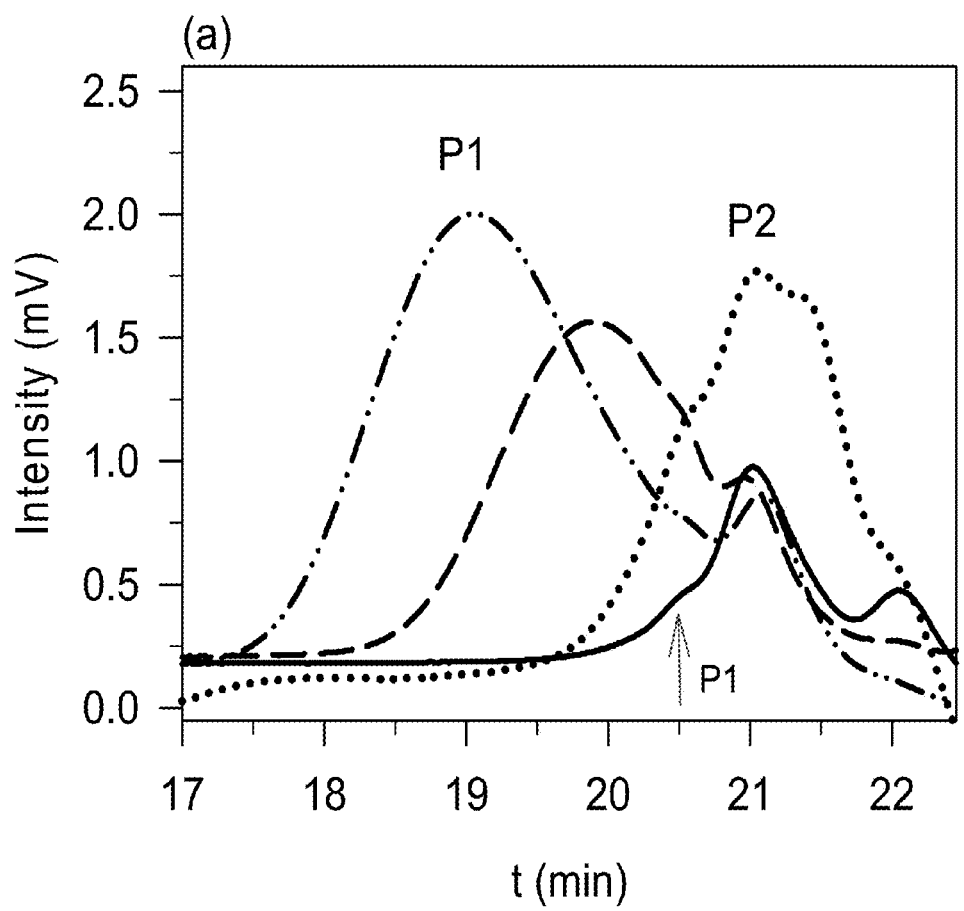
FIG. 3A depicts GPC curves of PED0.8 at different reaction times. (-) 1 h, (•••••)2 h, (- - -) 10 h, (- •• -) 30 h, P1: Peak representing larger oligomers, and P2: Peaks representing monomers and smaller oligomers. Line is a fit of the data to an exponential rise to maximum function.

Molecular weight and PDI of PEDs were monitored as a function of reaction time for both synthetic routes with GPC. Molecular weight control by Route 1 The products of Route 1 were monitored with GPC for 30 h. Molecular weight parameters (Weight average molecular weight, $M_w$, Number average molecular weight, $M_n$, and polydispersity index, PDI) obtained for PEDs prepared by Route 1 before and after purification by fractional precipitation are listed in Table 2. FIG. 3A shows the GPC curves obtained at selected reaction times for PED0.8. They are representative of all the PEDs prepared by Route 1. The GPC was constituted of a leading peak (P1 in FIG. 3A) associated with the species with largest molecular size species, followed by two to three peaks (group P2 in FIG. 3A) associated with the smaller oligomers and unreacted monomers. The relative area under GPC peaks P1 and P2 is directly proportional to the conversion of the monomers into large species and small oligomers/monomer, respectively.

Figure 3B:
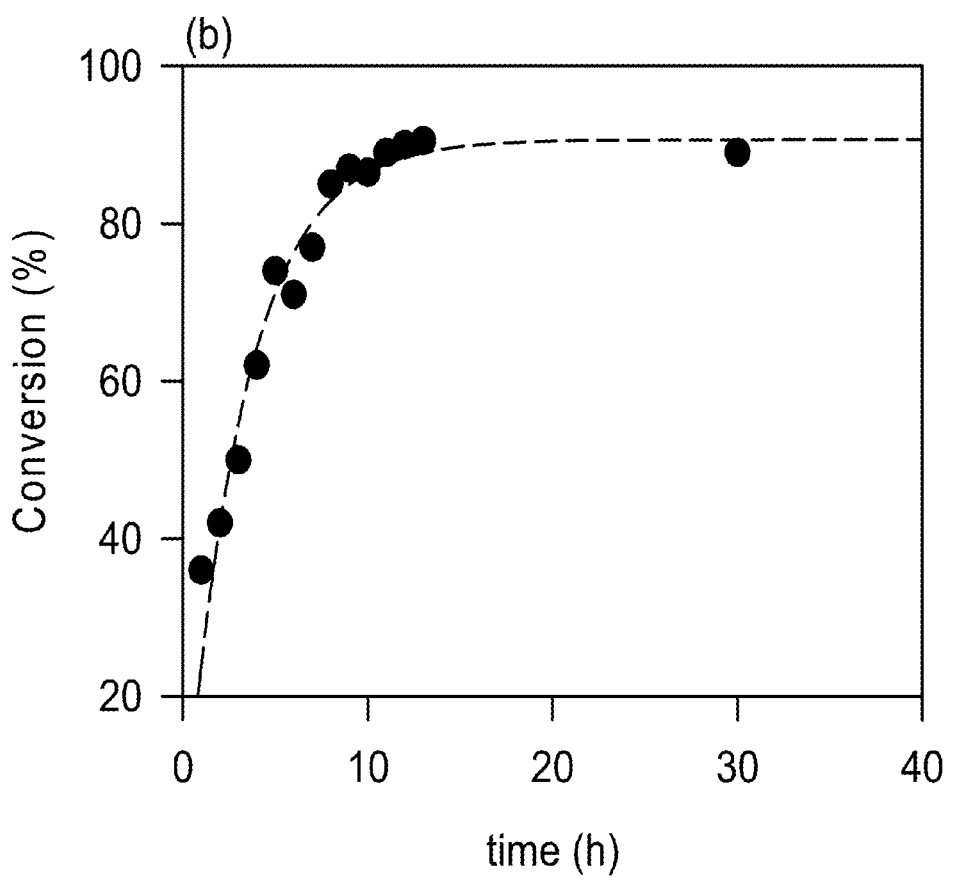
FIG. 3B depicts peaks representing conversion into large species versus time curve for PED0.8. Line is a fit of the data to an exponential rise to maximum function.

As can be seen in FIG. 3A, P1 was detected in the first hour (indicated with an arrow in FIG. 3A) indicating that larger species were formed at the early stages of the reaction. As expected, P1 shifted to shorter elution times as the reaction proceeded, indicating an increase in molecular weight of the larger species. As illustrated in FIG. 3B, showing the example of PED0.8, the conversion into large species increased steadily with time and plateaued at ~90% after 11 h, indicating that polyesterification reached equilibrium.

Figure 4A:
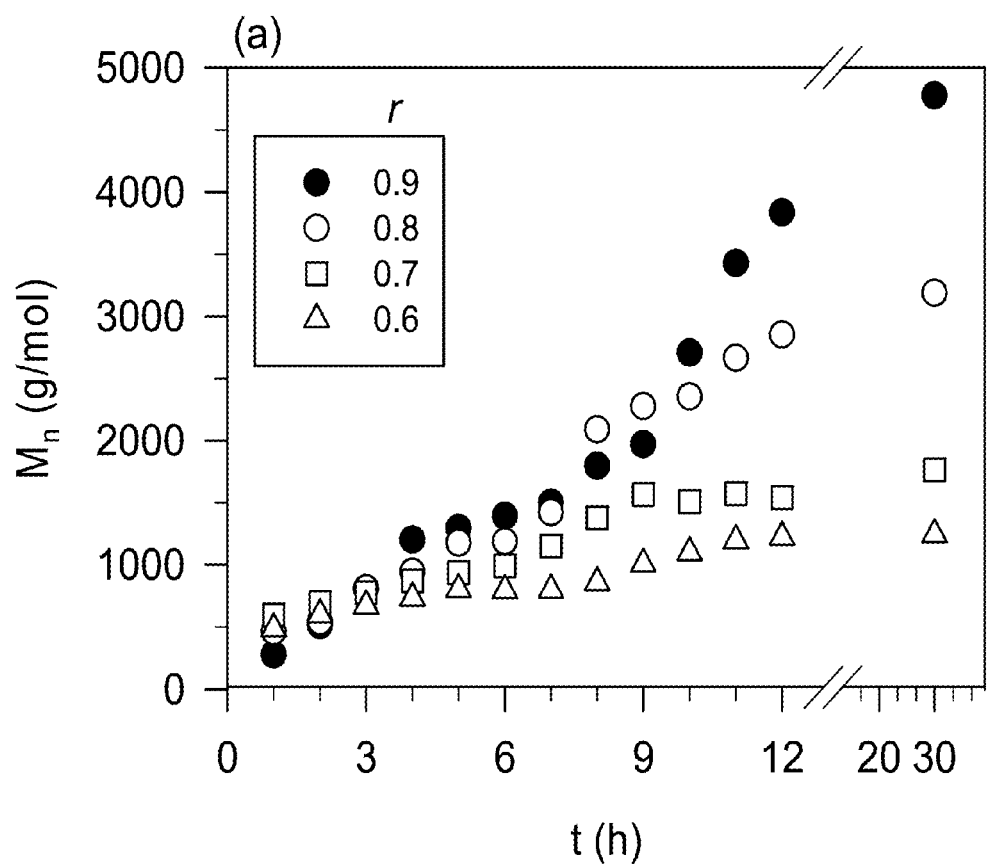
FIG. 4A depicts molecular weight with reaction time of PEDs obtained with different initial stoichiometric imbalance. (●) PED0.9, (○) PED0.8, (□) PED0.7, (Δ) PED0.6.
Figure 4B:
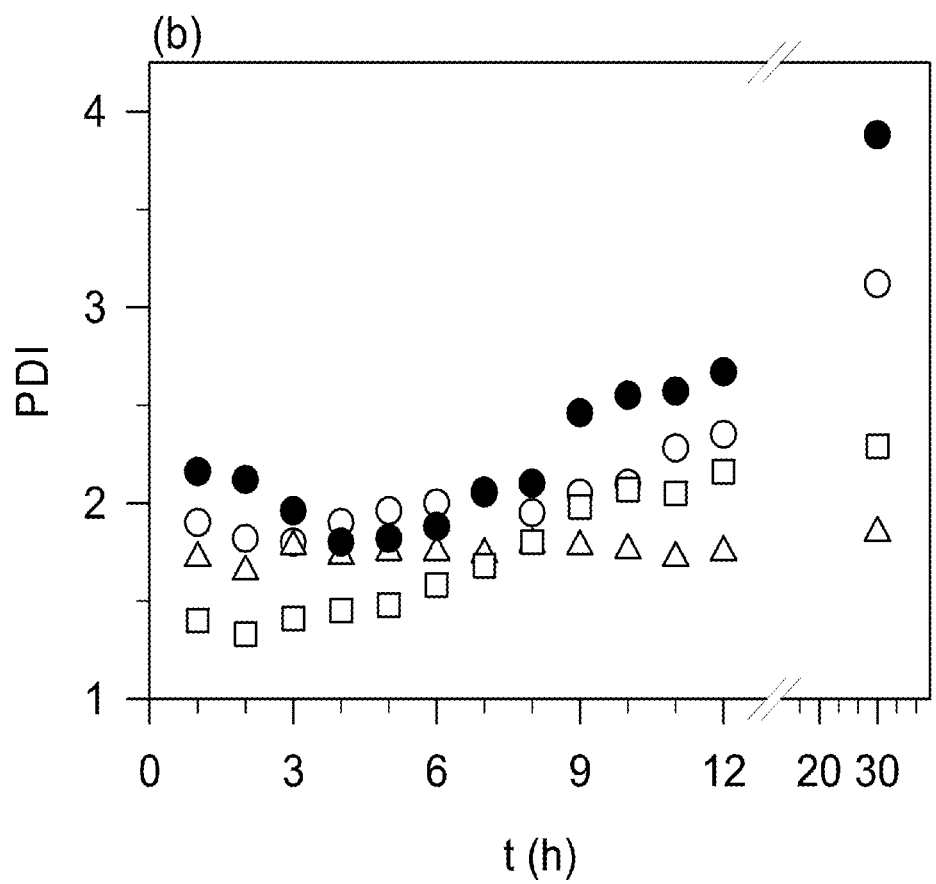
FIG. 4B depicts PDI development with reaction time of PEDs obtained with different initial stoichiometric imbalance. (●) PED0.9, (○) PED0.8, (□) PED0.7, (Δ) PED0.6.

The evolution of $M_n$ and PDI with reaction time obtained for PEDs in the different reactions conducted using Route 1 are shown in FIG. 4A and FIG. 4B, respectively. Overall, the PEDs prepared by Route 1, showed a wide range of molecular weights and PDI (Table 2). PEDs with r values closer to unity showed higher molecular weights and also higher PDI.

One can observe two stages of relative rapid growth (0 to 4 h and 9 to 30 h, in the case of PED0.9 for example, filled circles in FIG. 4A) separated by a stage where growth was slower. Polymerization was less rapid in the intermediary stage (4 to 9 h, in the case of PED0.9, filled circles in FIG. 4A) attributed to the transition caused by the shift in reaction between polar diacids and diols to the competing reaction between growing PED molecules in an increasingly less polar medium. As the reaction proceeded, the polarity of the reaction medium decreased, further prompting a further acceleration of molecular weight increase. Note that $M_n$ of PEDs obtained in the reactions conducted with r=0.9 and 0.8 (● and ○ in FIG. 4A) were much higher than those obtained with r=0.7 and 0.6 (□ and Δ in FIG. 4A), because in the latter, the concentration of excess diol available to react with the increasingly deficient diacid functional groups prevented the formation of higher molecular weight species.

Figure 5A:
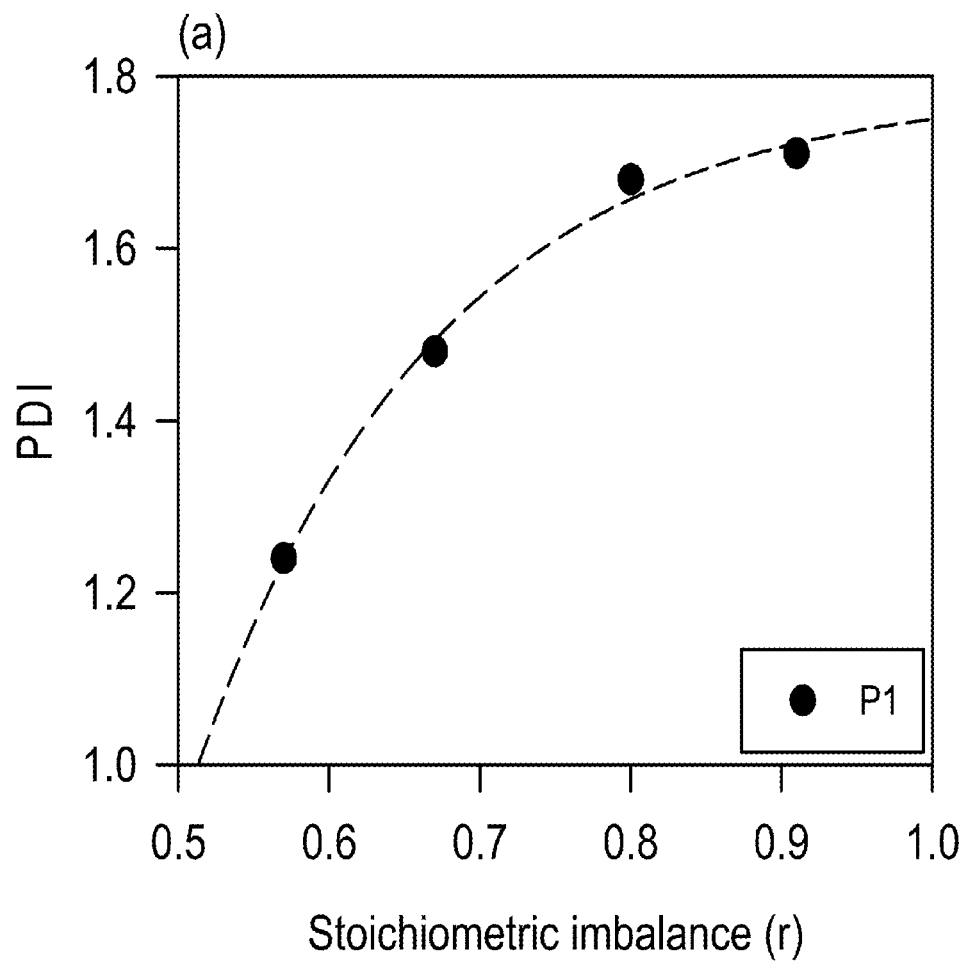
FIG. 5A depicts a PDI of PEDs versus initial stoichiometric imbalance measured by GPC at 10 h of reaction time. Dashed lines are guides for the eye.
Figure 5B:
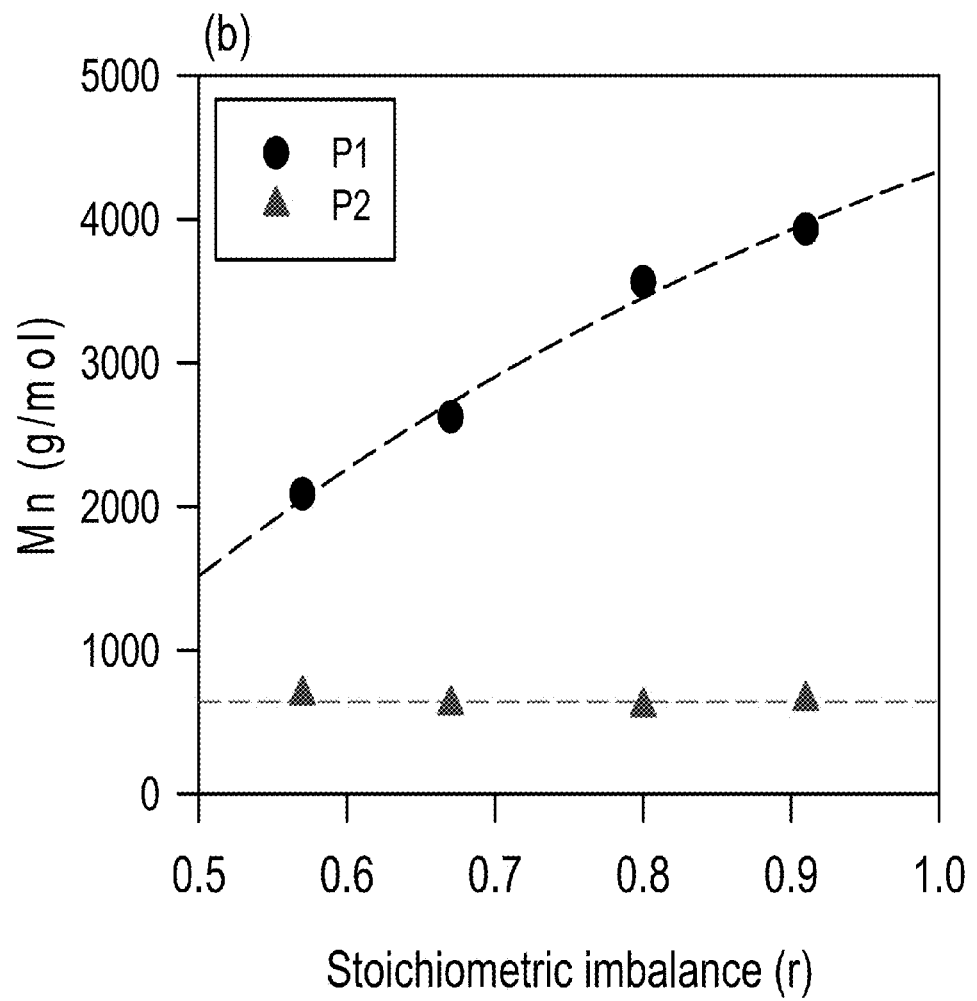
FIG. 5B depicts $M_n$ of PEDs versus initial stoichiometric imbalance measured by GPC at 10 h of reaction time. Dashed lines are guides for the eye.

The initial elevated PDI (FIG. 4B) observed in the first two hours of reaction is attributable to the random formation of dimers, trimers and larger oligomers. As polymerization proceeded further PDI decreased reaching a minimum shortly after (2 to 4 h, depending on the initial imbalance), then increased again relatively steadily. The development of narrower distribution of chains at the first stages of conversion was attributable to the mobility of the smaller oligomers which condense quickly to form larger oligomers of comparable size to the larger species. At higher conversions, the reactivity of the functional groups increased with molecular size leading to the increase of PDI. This trend was more pronounced when r is close to unity. As exemplified in FIG. 5A, showing the PDI of the different PEDs measured at 10 h, PDI increased with increasing stoichiometric imbalance. This was attributed to the differences in the reactivity of their terminal hydroxyl groups. Also, as exemplified in FIG. 5B, showing $M_n$ of the different PEDs measured at 10 h, the molecular weight of the larger (P1) oligomers increased predictably with r, whereas, the molecular weight of the smaller oligomers (P2) remained relatively unaltered (~650 gmol$^{-1}$).

Purification of the PEDs Obtained From Route 1

Figure 6A:
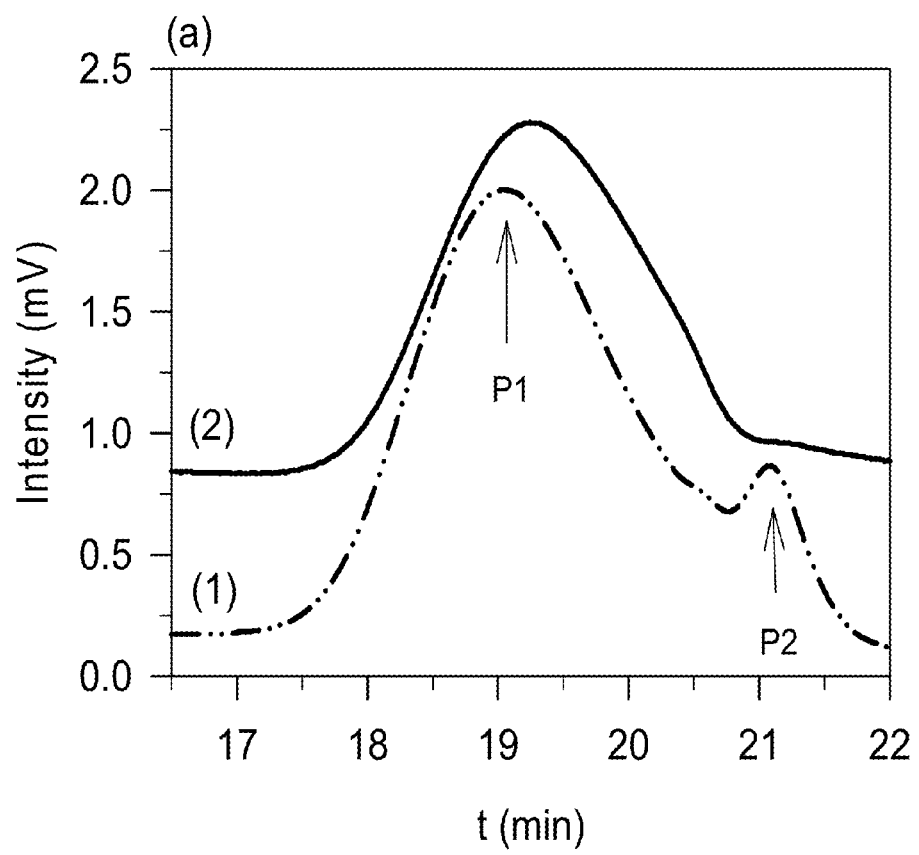
FIG. 6A depicts GPC curves of PED0.8 before (curve 1) and after purification by optimized fractional precipitation (curve 2). Dashed lines are fits of the data to exponential growth functions and straight lines, respectively.
Figure 6B:
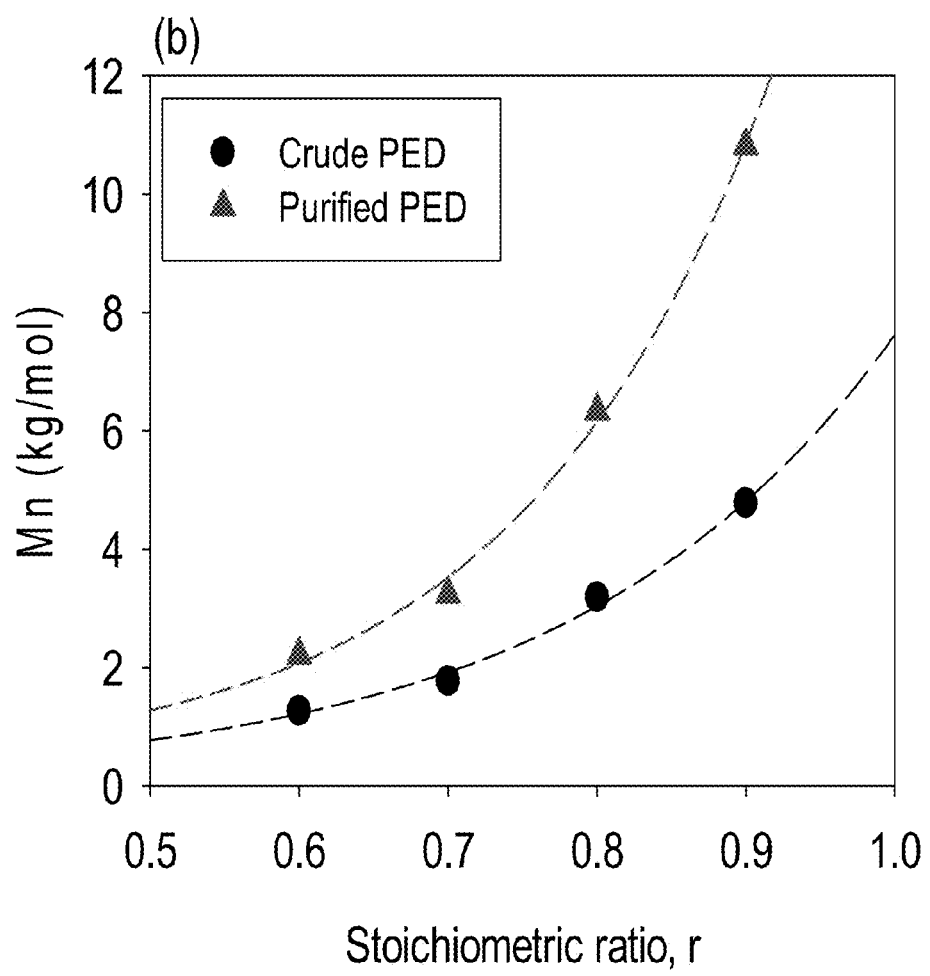
FIG. 6B depicts average number molecular weight ($M_n$) of PED0.8. Dashed lines in panel are fits of the data to exponential growth functions and straight lines, respectively.
Figure 6C:
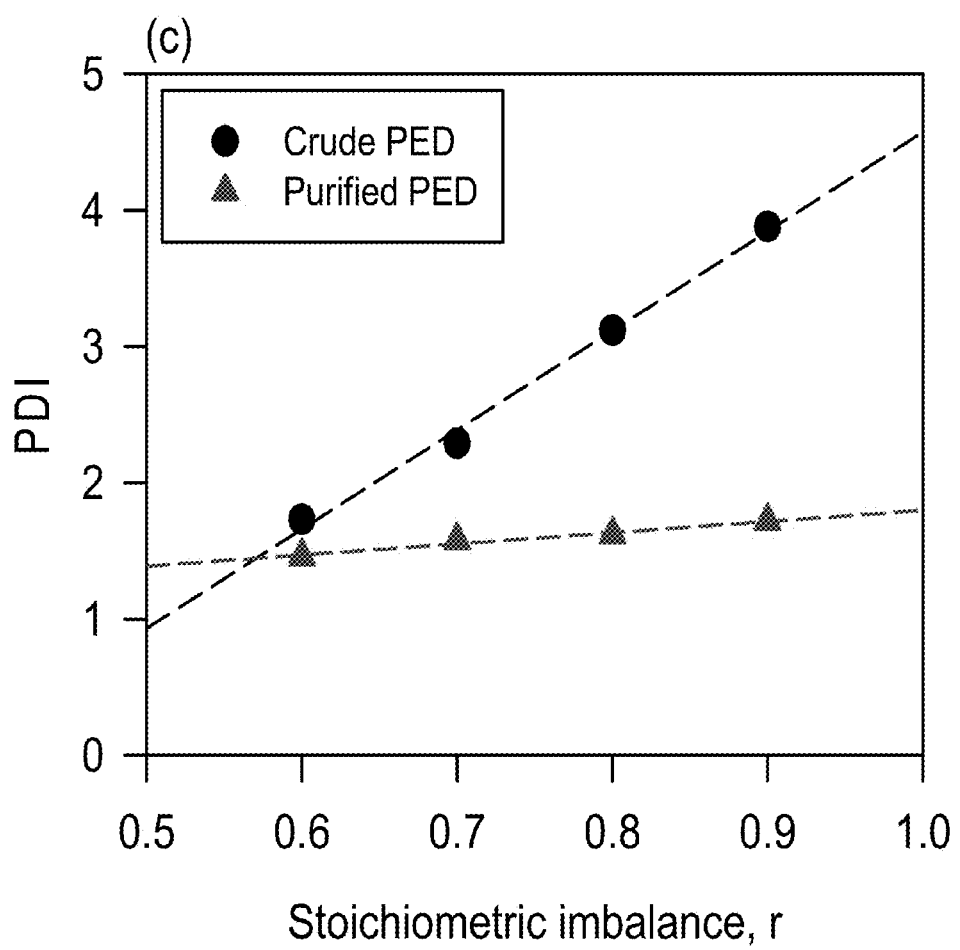
FIG. 6C depicts a PDI versus initial stoichiometric imbalance obtained using synthesis Route 1.

The results of the purification are listed in Table 2. GPC curves of PED0.8 before and after optimized fractional precipitation are shown in FIG. 6A as an example of the results obtained for the PEDs of Route 1. As can be seen, the low molecular weight species, characterized by the secondary peaks in the GPC curves (P2 of curve 1 in FIG. 6A), were effectively filtered out in a single step. The purified PEDs from Route 1 presented $M_n$ between 2000 and 11000 gmol$^{-1}$ with PDI between ~1.5 and 1.7 (Table 2). Furthermore, as shown in FIGS. 6B and 6C, both $M_n$ and PDI characteristics scale predictably with the initial imbalance. The synthesis data indicated that one can effectively control molecular weight and PDI of PEDs very precisely by controlled initial stoichiometric imbalance followed with adapted fractional purification.

TABLE 2

GPC results for PEDs prepared by Route1.

| Route 1 | Crude | | | | Purified | | | |
|---|---|---|---|---|---|---|---|---|
| | $M_w$ | $M_n$ | PDI | P1 | $M_w$ | $M_n$ | PDI | Yield |
| PED0.9 | 18552 | 4777 | 3.88 | 8247 | 18617 | 10824 | 1.72 | 73 |
| PED0.8 | 9908 | 3188 | 3.12 | 5625 | 10279 | 6345 | 1.62 | 67 |
| PED0.7 | 4047 | 1765 | 2.29 | 3042 | 5126 | 3244 | 1.58 | 55 |
| PED0.6 | 2187 | 1264 | 1.73 | 2229 | 3240 | 2219 | 1.46 | 40 |

Crude: before purification, Purified: after purification, Weight average molecular weight: $M_w$ (gmol$^{-1}$), Number average molecular weight: $M_n$ (gmol$^{-1}$), and polydispersity index: PDI. yield (%) of PEDs after purification. The uncertainties attached to molecular weight, PDI and yield is better than 211 gmol$^{-1}$, 0.1 and 5.0%, respectively.

One can note a significant decrease in the yield of purified PEDs with increasing stoichiometric imbalance (from 73% for PED0.9 to 40% for PED0.6). This is commensurate with the lower relative conversion to larger oligomers in PEDs with lower r values, resulting in the extraction of a majority of small molecules as impurities.

Molecular Weight Control by Route 2

In Route 2, the objective was to initiate polymerization with an initial r value close to unity to achieve high relative conversion and then induce further stoichiometric imbalance with excess diol, before polyesterification approaches equilibrium. The excess diol was expected to end-cap oligomers with —OH groups abruptly and arrest polymerization. The initial imbalance of 0.8 that yielded a purified PED with a $M_n$ value of 6345 gmol$^{-1}$ and PDI of 1.62 was selected as the start of the reactions conducted with Route 2. This choice was made as one can achieve the targeted molecular weights (between 5000 and 1000 gmol$^{-1}$) by arresting the polymerization with an induced stoichiometric imbalance at judiciously selected times. The extra diacid to diol ratio was fixed at r=0.1 so to achieve at that time a stoichiometric imbalance between 0.8 and 0.67. The extra diol was incorporated at 1, 3, 5 and 7 h after the reaction was started, and the reactions were stopped by cooling four hours after the induced stoichiometric imbalance. In all cases, this extra time was sufficient for reaching equilibrium conditions.

Figure 7A:
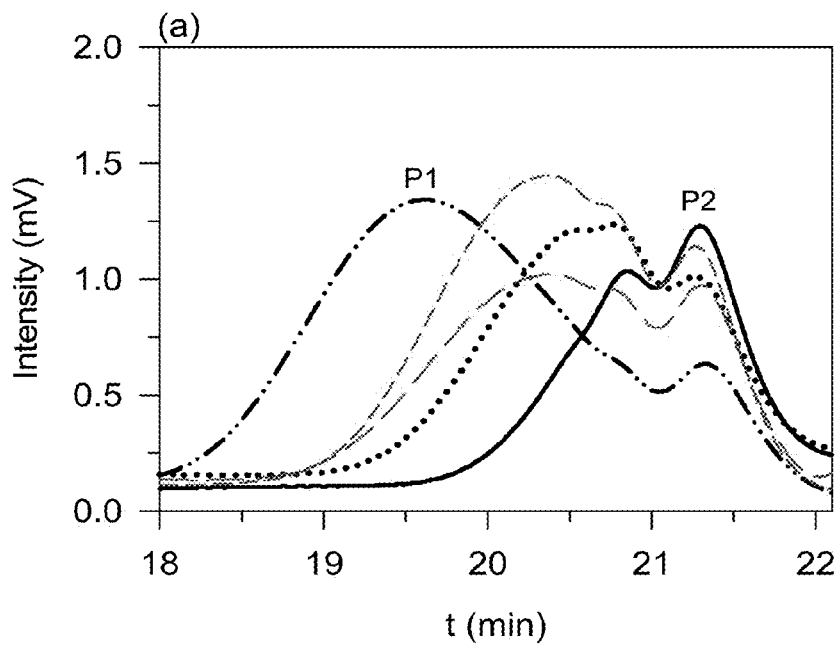
FIG. 7A depicts GPC curves of PED0.8-d obtained at different reaction times. (-) 2 h, (••••) 3 h, (- ••-) 7 h, (- - -) 8 h, (- -) 11 h. Dashed lines are guides for the eye. PED0.8-d: reaction in which extra diol was introduced at 7 h.
Figure 7B:
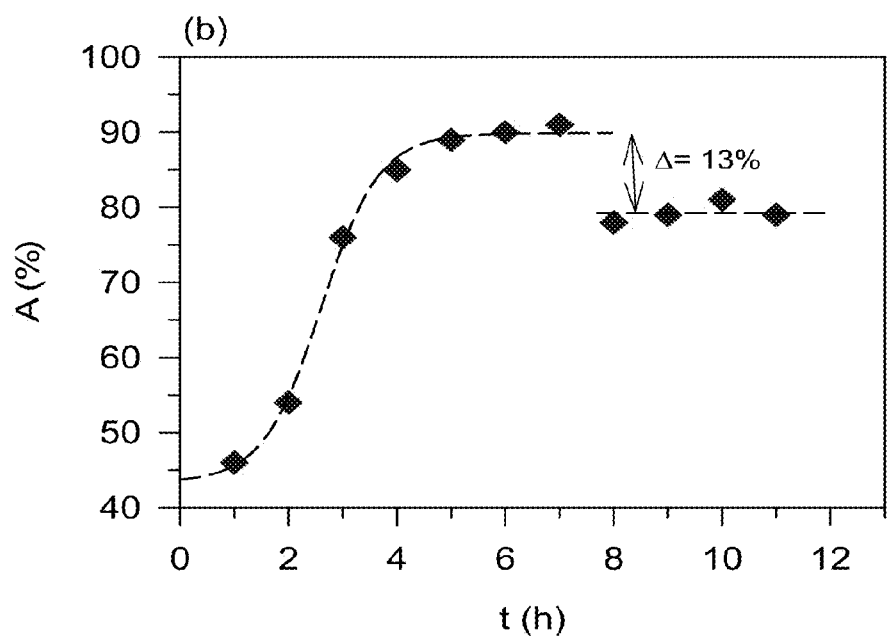
FIG. 7B depicts relative conversion of monomers versus time to (◇) large oligomers in PED0.8-d. Dashed lines are guides for the eye. PED0.8-d: reaction in which extra diol was introduced at 7 h.

FIG. 7A presents the GPC curves of a representative PED prepared by Route 2 (namely PED0.8-*d*). GPC data in FIG. 7B presents the relative conversion (Δ %) for the PED obtained with the reaction in which extra diol was introduced at 7 h (PED0.8-*d*) representative of the effect of additional diol on reaction products of Route 2. Table 3 shows the molecular weight parameters obtained for PEDs prepared by Route 2, before and after extra diol addition. The effect of induced stoichiometric imbalance in PEDs was correlated with molecular weight and PDI with respect to reaction time.

As indicated by the shift of P1 to shorter elution times, molecular weight increased steadily until the extra diol was added to the reaction (GPC curve of PED0.8-*d* in FIG. 7A). Just an hour after the induced stoichiometric imbalance, P1 shifted back to a higher fixed elution time indicating a drop of molecular weight to its equilibrium value.

The conversion of larger oligomers increased with time in an exponential manner, and then dropped to an equilibrium value after the extra diol was added. The drop in conversion was attributed to the concurrent effect of the extra NDO which lowers r and the presence of water, the reaction byproduct. Recall that the reaction proceeded under an $N_2$ atmosphere during one hour after the extra diol was added, and that vacuum was applied only afterwards. The drop (Δ in FIG. 7B) was maximum for PED0.8-*d* (13%) then decreased with decreasing $t_E$ (5% for PED0.8-*c* and 3% for PED0.8-*b*). No decline in conversion was observed in PED0.8-*a* ($t_E$=1 h). This was attributed to the fact that at lower conversions when stoichiometric imbalance was induced, the presence of active sites still available for polymerization in monomers (as in PED0.8-*a*, 1 h), carboxyl/hydroxyl or dicarboxyl terminated dimers and small oligomers offset the decline in conversion. For PED0.8-*d*, polymerization was extensive and lack of active sites on the formed PEDs ($t_E$=7 h) account for the steep decline in conversion. A similar trend was observed before and after induced stoichiometric imbalance for molecular weight and PDI of PEDs of Route 2 (Table 3).

TABLE 3

GPC data for PEDs prepared by Route 2.

|  | PED0.8-a | PED0.8-b | PED0.8-c | PED0.8-d |
|---|---|---|---|---|
| $M_n$ |  |  |  |  |
| $t_E$ | 655 | 2187 | 2320 | 2610 |
| $t_E$ + 1 h | 1417 | 1610 | 1842 | 1650 |
| $t_{Total}$ | 2153 | 1979 | 2197 | 1701 |
| PDI |  |  |  |  |
| $t_E$ | 2.50 | 2.50 | 2.62 | 2.68 |
| $t_E$ + 1 h | 1.67 | 1.98 | 2.04 | 1.73 |
| $t_{Total}$ | 2.42 | 2.57 | 2.59 | 1.97 |

Number average molecular weight: $M_n$ (gmol$^{-1}$), and polydispersity index: PDI,
$t_{Total}$ (h): total reaction time,
$t_E$ (h): time at which extra NDO was added and one hour after extra diol was added: $t_E$ + 1 h PED0.8-*b*, -*c* and -*d* showed a decline in at $t_E$+1 with the maximum decline seen for PED0.8-*d*, commensurate with the decline in conversion. At $t_{Total}$, these PEDs also showed $M_n$ values lower than the values at $t_E$. This can be attributed to the effect of intermolecular interchange reaction or transesterification of the larger species by the hydroxyl terminated NDO causing a breakdown of polyester chains. As a result, PED0.8-*d* which had the highest relative conversion at $t_E$ showed the largest drop in $M_n$. PED0.8-*b* and PED0.8-*c* showed some recovery of $M_n$ at $t_{Total}$ after the water was evacuated. $M_n$ of PED0.8-*a* increased at $t_E$+1 and at the end of the reaction, confirming that the induced stoichiometric imbalance did not arrest polymerization because of the insufficient reaction time (1 h). It is of note that both crude PED0.8-*b* and PED0.8-*c* showed molecular weights at $t_{Total}$ close to those of $t_E$ indicating that effective cessation of polymerization had been achieved by induced stoichiometric imbalance at 3 h and 5 h of reaction time.

As expected the PDI for all PEDs declined at $t_E$ due to the decrease in stoichiometry (Table 3), which increased the average number of small species in reaction. PDI increased at $t_{Total}$ the broadening effect of transesterification products on of the molecular weight distribution.

Purification of the PEDs Obtained From Route 2

Figure 8:
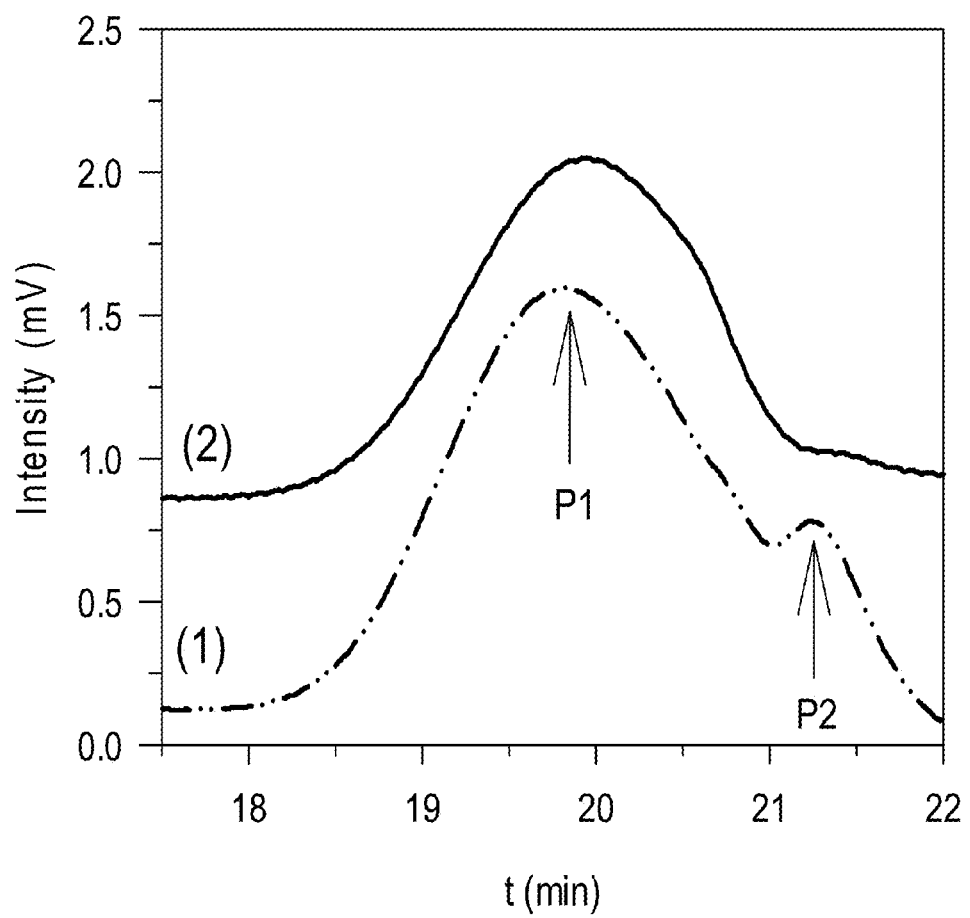
FIG. 8 depicts GPC curves of PED0.8-b before and after optimized fractional precipitation are shown as an example of the results obtained for the PEDs of Route 2.

The results of the purification of the PEDs obtained from Route 2 are listed in Table 4. GPC curves of PED0.8*a* before and after optimized fractional precipitation are shown in FIG. 8 as an example of the results obtained for the PEDs of Route 2. As indicated in Table 4, the purified PEDs from Route 2 presented $M_n$ values between 3000 and 6000 gmol$^{-1}$ with a consistent PDI of ~1.4, consistent with the desired molecular weight range.

It is also of note that molecular weight of most purified PEDs obtained from Route 2 are between those of purified PED0.8 and PED0.7, and show consistent PDI indicating a very effective control of the products of the reaction.

TABLE 4

GPC results obtained for PEDs prepared with Route 2.

|  | Crude | | | Purified | | | | Yield |
|---|---|---|---|---|---|---|---|---|
| Route 2 | $M_w$ | $M_n$ | PDI | $M_n$ (P1) | $M_w$ | $M_n$ | PDI | (%) |
| PED0.8-a | 5056 | 2153 | 2.42 | 3292 | 8396 | 5997 | 1.40 | 67 |
| PED0.8-b | 5086 | 1979 | 2.57 | 3031 | 6933 | 4781 | 1.45 | 77 |
| PED0.8-c | 5690 | 2197 | 2.59 | 3933 | 8453 | 5870 | 1.44 | 66 |
| PED0.8-d | 3351 | 1701 | 1.97 | 2670 | 4449 | 3068 | 1.45 | 54 |

Crude: before purification, Purified: after purification, $M_w$ (gmol$^{-1}$) = Weight average molecular weight, $M_n$ (gmol$^{-1}$) = Number average molecular weight, and PDI: polydispersity index. Yield (%) of PEDs after purification. The uncertainties attached to molecular weight, PDI and yield are better than 211 gmol$^{-1}$, 0.1 and 5.0%, respectively Reaction Kinetics of Polymerization The practical synthesis of polymers with specific molecular weights by condensation polymerization requires the knowledge of the kinetics of the reaction. Polyesterification between a diacid and a diol occurs in a stepwise manner where dimers and trimers, formed early in the reaction, condense with each other and with larger oligomers to form a higher molecular weight polymer. The reaction system is therefore constituted of simultaneous, parallel and competitive reactions occurring at different rates. Thus, the rate of polyesterification is the sum of the rates of reaction between these individual molecules of various sizes. In this work, kinetics of polymerization was studied for the PEDs prepared under non-stoichiometric conditions by Route 1.

For the non-stoichiometric step polymerization of PEDs, the number-average degree of a step-wise polymerization ($X_n$) can be expressed by the Carothers equation (Eq. 1), where r is the monomer ratio and P is the extent of reaction.

$$X_n = \frac{1+r}{1+r-2rp} \tag{1}$$

Figure 9:
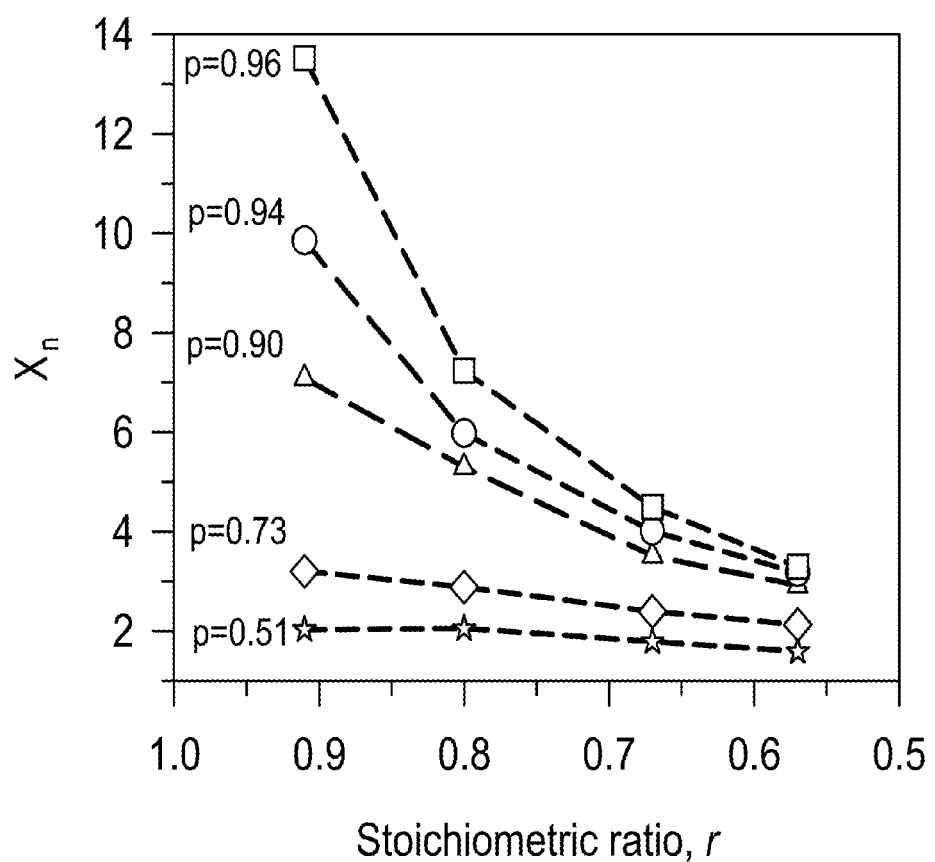
FIG. 9 depicts a number average degree of polymerization ($X_n$) versus stoichiometric ratio (r) at different extents of reaction (p) in PEDs prepared by Route 1. Dashed lines are guides for the eye.

For PEDs to have $M_n$ values in the range of 1000-5000 gmol$^{-1}$, $X_n$ at complete conversion may vary from 5 to 25. Equation 1 and FIG. 9 demonstrate the combination of parameters r and p required for molecular weight control in PEDs from Route 1. For r=0.9 and 0.6, at p=0.96, $X_n$ is 14 and 3 ($M_n$=3427 and 1243 gmol$^{-1}$), respectively. $X_n$ decreases to 2 and 1.6, respectively at p=0.51 suggesting that $X_n$ does not vary significantly with r at low extents of reaction (p). Also to achieve a specific $X_n$, higher extents of reaction are required for lower r values. The shape of the $X_n$ versus r plots (FIG. 9) also indicates that r has a very significant effect on the polymer molecular weight ($X_n$=Mn/average molecular weight of monomers) and that a stricter control of r is required in order to achieve higher degrees of polymerization.

The polyesterification reaction rate is defined by the rate of disappearance of the diacid (Eq. 2), $$\frac{-d[COOH]}{dt} = k[COOH][OH] \quad (2)$$

where [COOH] and [OH] are the concentrations at time t of diacid and diol, respectively, and k is the reaction rate constant. In case of catalyzed reactions with non-stoichiometric amounts of reactants, the stoichiometry is given by equation 3:

$$[COOH]_0 - [COOH] = [OH]_0 - [OH] \quad (3)$$

where [COOH]$_0$ and [OH]$_0$ are the initial concentrations of the diacid and diol groups, respectively.

The combination of equations 2 and 3, further processed by integration, results in equation 4.

$$\ln\left[\frac{[OH]}{[COOH]}\right] = -\ln r + [OH]_0(1-r)kt \quad (4)$$

Equation 4 is a function of the stoichiometric imbalance r, and assuming the rate of reaction to be second order, a plot of 1 n[[OH]/[COOH]] versus time may yield straight lines with slopes equal to the reaction constant (k). The concentrations of the diacid and diol groups at time t ([COOH](t) and [OH](t), respectively), were derived from the initial concentrations as a function of extent of reaction (p) are expressed in Equation 5.

$$[COOH](t) = [COOH]_0(1-p) \quad (5)$$

Figure 10:
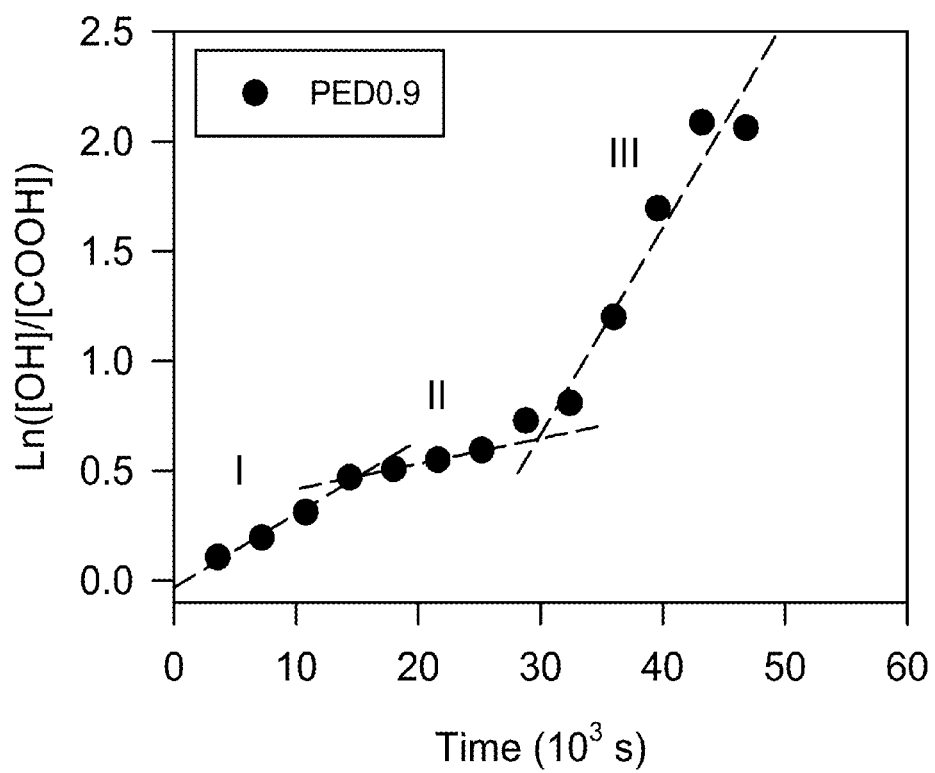
FIG. 10 depicts a ln[[OH]/[COOH]] versus time plot for PED0.9. I, II and III are linear segments delimiting the regions of second order reaction fitted to straight lines ($R^2$>0.9277).

The plot of ln[[OH]/[COOH]] versus time for PED0.9 is shown in FIG. 10, representative of all the PEDs synthesized using Route 1. The results of the analysis including the limits of individual linear segments and corresponding rate constants (k) obtained from the fit to straight lines are listed in Table 5. The kinetic data of each PED showed three distinct linear regions (denoted as I, II and III in FIG. 10) indicating three different polymerization rate constants. The varying rate constant was attributed to the change in reactivity with the molecular size of PEDs.

TABLE 5

Results of the kinetic analysis (eq. 4) for the PEDs prepared by Route 1.

| | | | | | k × 10$^{-3}$ | | | |
| --- | --- | --- | --- | --- | --- | --- | --- | --- |
| | | | | | $k_{P2}$ | | $k_{P1}$ | |
| PED | | I | II | III | I | II | III | μ |
| PED0.9 | $M_n$ | 280-1300 | 1300-1950 | 1950-4000 | 6.2 | 9.02 | 111 | 0.056 |
| | $X_n$ | 1.5-7.5 | 7.5-11.5 | 11.5-22.0 | | | | |
| | t | 1-5 | 5-9 | 9-12 | | | | |
| PED0.8 | $M_n$ | 450-1000 | 1000-1400 | 1400-3000 | 2.2 | 4.29 | 21.3 | 0.10 |
| | $X_n$ | 2.5-5.5 | 5.5-8.0 | 8.1-16.5 | | | | |
| | t | 1-4 | 4-7 | 7-12 | | | | |
| PED0.7 | $M_n$ | 600-900 | 900-1000 | 1000-1550 | 1.2 | 1.6 | 8.0 | 0.15 |
| | $X_n$ | 3.5-5.0 | 5.0-6.0 | 6.0-9.0 | | | | |
| | t | 1-4 | 4-6 | 6-9 | | | | |
| PED0.6 | $M_n$ | 500-800 | 800-850 | 850-1200 | 1.1 | 0.08 | 4.3 | 0.26 |
| | $X_n$ | 3.0-4.5 | 3.0-5.0 | 5.0-7.0 | | | | |
| | t | 1-5 | 5-7 | 7-11 | | | | | k (L mol$^{-1}$s$^{-1}$) = Kinetic rate constant.
$X_n$ = Number average degree of polymerization,
$M_n$(gmol$^{-1}$) = Number average molecular weight,
t(h) = limits of time for each region.
$k_{P1}$ and $k_{P2}$: reaction rate constants for smaller (P2) and larger oligomers (P1), respectively.

As indicated by the kinetic data (Table 5), overall, the rate of reaction increased as the reaction proceeded over the three delimited regions, particularly in PED0.9. This was attributable to a shift in the polarity of the reaction medium from the initial highest polarity of the carboxyl and hydroxyl mixture to the less polar ester groups, combined with the continuous evacuation of byproduct water. Previous studies have shown that for reaction systems with variable rate constants in a bifunctional condensation polymerization, the rate constant increases with molecular size when there is an increase in reactivity of the functional groups of species larger than a dimer.

In region I, monomer and small oligomers like dimers and trimers (P2) are dominant and the rate constants $k_I$ (also labeled $k_{P2}$) was the lowest. The reaction system in region III is driven by the functional group reactivity of the polymeric species (P1). As the chain length increased, the probability of intra-molecular functional group encounters was reduced and linear polymerization was favored thermodynamically. The reaction rate constant in this region, $k_{III}$ (also labeled $k_{P1}$), is the highest for all PEDs. Region II is a transitional linear region with a smaller slope where functional group reactivity of the polymeric species (P1) and small oligomers (P2) compete. Also, a competing tendency for intra-molecular cyclization in molecules of dimer and trimer size, reduces reactivity towards linear polymerization. As indicated in Table 5, this region is most extended in PED0.9 and shortest in PED0.6.

The rate constants decreased with increasing r (Table 5). This was attributed to the corresponding diminishing concentration of free unassociated acid functional groups and the growing interaction of the excess diol concentration with diacid monomers. The difference in reactivity of the [COOH] and [OH] groups can be expressed in terms of the parameter $\mu=k_{P2}/k_{P1}$, the ratio between $k_{P2}$ and $k_{P1}$. When P1 is more reactive than P2, such as in the case of PED0.9, low values of $\mu$ are obtained, and longer reaction times are required to achieve higher degrees of polymerization. Smaller values of $\mu$ indicate that the reactivity of P1 drives polymerization.

Thermal Properties of PEDs
Thermal Stability

The thermal stability of polyurethanes depend on the oligomeric-polyol structure, the nature of the alcohol groups, and the mobility of the polymer chains. Polyurethanes based on polyester polyols with primary hydroxyl groups and low chain mobility are more thermostable than other aliphatic polyol based flexible polyurethanes. Thermoplastic poly(ester urethane)s (TPEU)s also show restrained mobility due to the intensified dipole-dipole and the van der Waals interactions introduced by the ester chains which enhance their thermal stability.

Figure 11A:
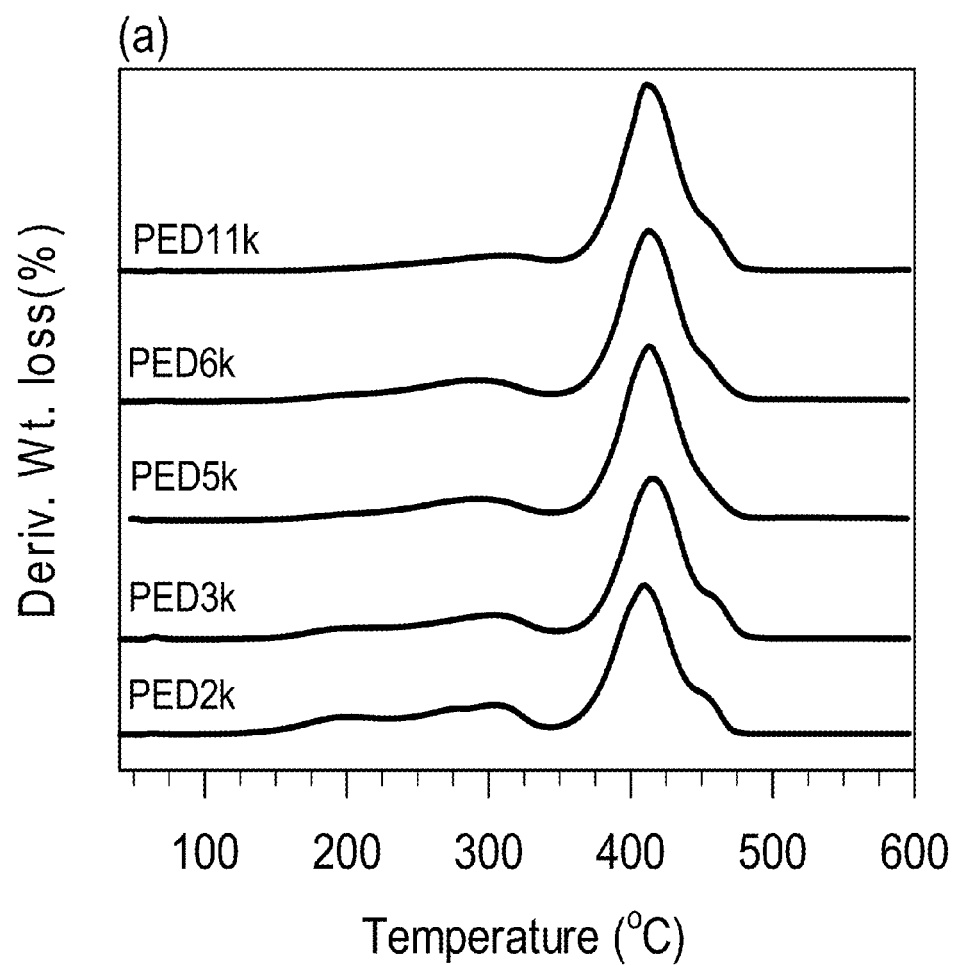
FIG. 11A depicts DTG curves for PEDs measured at a heating rate of 10° Cmin$^{-1}$.
Figure 11B:
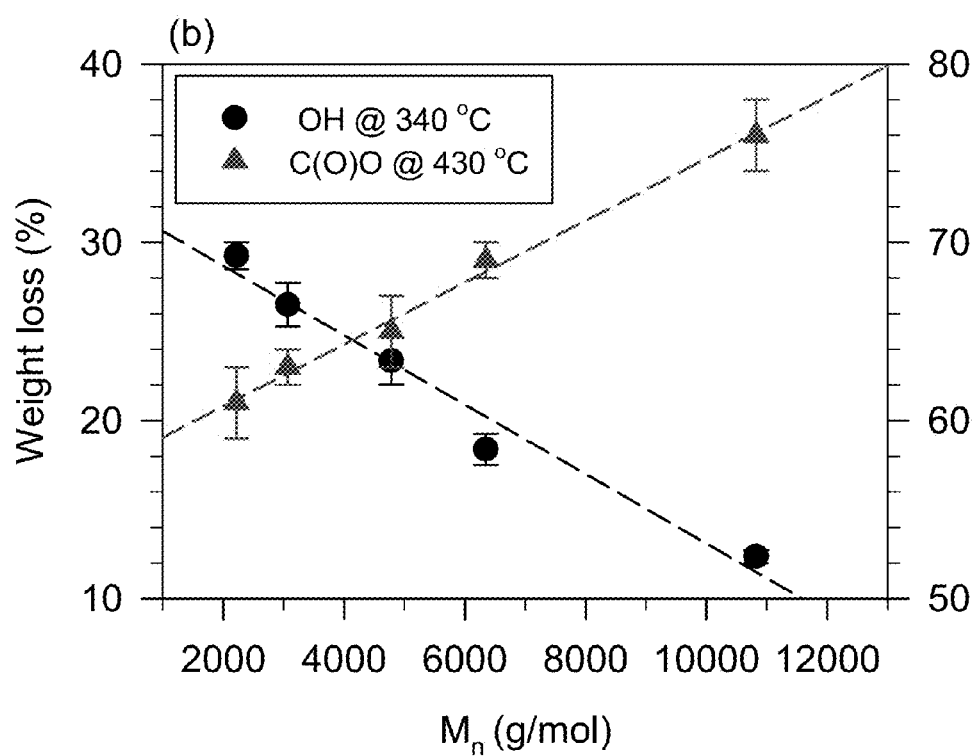
FIG. 11B depicts weight loss in (●) hydroxyl and (▲) ester content.

Five molecular weight controlled PEDs with Mn ranging from 2000-11000 gmol$^{-1}$, reflecting the entire range of PEDs obtained by either Route 1 or Route 2, were selected to study the thermal properties. The samples were labeled according to their rounded Mn values (Table 6). FIG. 11A shows the DTG curves of the selected PEDs. The onset temperatures of decomposition determined at 5.0% weight loss ($T_{5\%}$), the peak decomposition temperatures ($T_{D1-3}$) and the weight loss at each decomposition stage ($\Delta W_{1-3}$) are listed in Table 6. The PEDs exhibited a multistep degradation process. The initial weight loss of ~10% recorded at DTG peak temperatures in the range of 190-200° C. is attributed to the loss of the unassociated terminal hydroxyl group in PEDs. Some of the weight loss in this region may also be due to the evaporation of residual nonanediol at 187° C. Decomposition at ~300° C. ($\Delta W_1$) was due to the decomposition of the hydroxyl groups associated possibly by hydrogen bonding. The major weight loss event ($\Delta W_2$) between 350° C. and 445° C. was due to the decomposition of the ester groups initiated by the random scission of the alkyl-oxygen bonds. The final decomposition step, manifested as a small shoulder to the main DTG peak at ~460° C. ($\Delta W_3$=~10%), was related to the overlap of the decomposition of C—C backbone of the polyester chains at high temperatures. The variation of $\Delta W_1$ and $\Delta W_2$ with Mn for the selected PEDs is shown in FIG. 11B.

TABLE 6

Thermal decomposition data obtained from TGA and DTG.

| Sample | M$_n$ | T5% | T$_{D1}$ | T$_{D2}$ | T$_{D3}$ | $\Delta W_1$ | $\Delta W_2$ | $\Delta W_3$ |
|---|---|---|---|---|---|---|---|---|
| PED11k | 10824 | 277 | 305 | 412 | 460 | 13 | 76 | 11 |
| PED6k | 6345 | 240 | 296 | 413 | 457 | 19 | 69 | 10 |
| PED5k | 4781 | 214 | 304 | 414 | 457 | 23 | 65 | 9 |
| PED3k | 3068 | 207 | 304 | 412 | 461 | 24 | 63 | 9 |
| PED2k | 2219 | 193 | 303 | 411 | 459 | 30 | 61 | 8 |

$T_{5\%}$: onset temperature of thermal decomposition determined at 5% weight loss; $T_{D1-3}$: Top peak temperatures of the DTG curves. $\Delta W_1$, $\Delta W_2$, $\Delta W_3$ (%): Weight loss calculated for each decomposition stage. The characteristic decomposition temperatures and weight losses are measured to better than 3.0° C. and 3%, respectively.

As can be seen in FIG. 11B, the weight loss due to the degradation of ester groups ($\Delta W_2$ in FIG. 11B) increased linearly with Mn concomitantly with the linear decrease of the weight loss due to the —OH group decomposition ($\Delta W_1$ in FIG. 11B). As determined with the slopes of a fit to straight lines ($R^2>0.9717$), the rate at which these variations occurred were practically the same (2% per kgmol$^{-1}$). This result confirmed the relation of molecular weight of polyester chains to its terminal hydroxyl content in PEDs. PED11k which had the highest molecular weight has the longest polyester chains with only two terminal hydroxyl groups whereas PED2k with fewer polyester groups showed maximum hydroxyl content.

The lipid derived PEDs of the present work showed $T_{5\%}$ values from 193 to 277° C., indicative of good thermal stabilities. These values are in the range of degradation temperatures presented by similar compounds deemed suitable as building blocks for making linear alkyl PEU elastomers.

Melt Transition Behavior of PEDs

Figure 12:
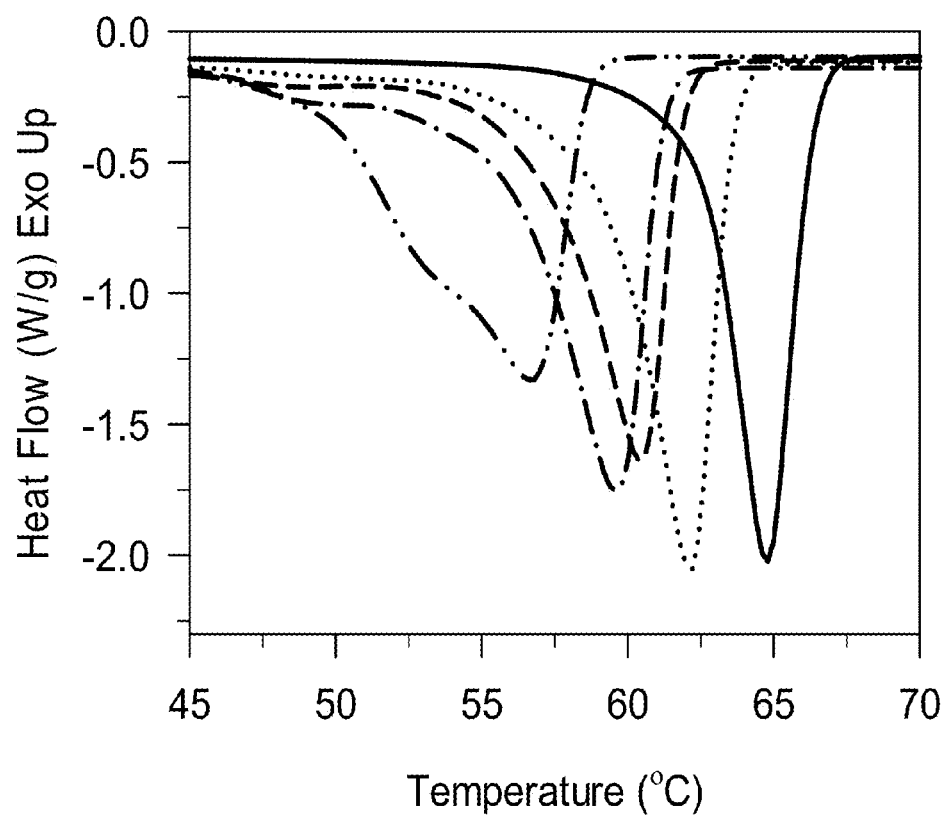
FIG. 12 depicts DSC melting thermograms for PEDs. (-) PED11k, (••••) PED6k, (- - -) PED5k, (- ⊙ -) PED3k, (- ⊙⊙⊙ ⊙ -) PED2k.

The DSC thermograms obtained from the second heating cycle of the PEDs are shown in FIG. 12. The corresponding DSC data are listed in Table 7.

TABLE 7

Onset ($T_{on}$), peak ($T_m$) temperature of melting; enthalpy of melting ($\Delta H$); obtained from DSC. The uncertainties attached to the characteristic temperatures, and enthalpies are better than 1.0° C., and 4 J/g respectively.

| Sample | M$_n$ | T$_{on}$ | T$_m$ | $\Delta H$ |
|---|---|---|---|---|
| PED11k | 10824 | 62.30 | 64.70 | 130 |
| PED6k | 6345 | 60.40 | 62.19 | 134 |
| PED5k | 4781 | 54.20 | 60.49 | 139 |
| PED3k | 3068 | 44.97 | 59.54 | 151 |
| PED2k | 2219 | 48.29 | 56.28 | 155 |

All the PEDs melted between 56 and 65±0.1° C. The polyesters with longer chains recorded higher melting temperatures suggesting a better packing. The enthalpy of melt of the PEDs increased with decreasing molecular weight underscoring the effect of increasing crystallinity due to increased intermolecular hydrogen bonding by terminal —OH groups. It is also worthy to note that PDI, which is a measure of disorder in the polymer chains, is higher for PED1k (1.7) and PED6k (1.6) compared to PED5k and PED2k with PDI closer to 1.4, resulting in reduced enthalpy.

PEDs showed a range of melting temperature (56-65° C.) which was an important parameter for the reprocessability of thermoplastic materials. They exhibited Tm comparable to some biobased and commercially available petroleum based polyester molecular weight analogues used in the manufacture of degradable TPEUs as listed in Table 8.

TABLE 8

Temperature of melting ($T_m$) for PEDs and petroleum based (p) and biobased (b) polyesters with varying molecular weights and structure.

| | PEDs | | Biobased/petroleum based polyesters | | | |
|---|---|---|---|---|---|---|
| | $M_n$ | $T_m$ | | Structure | $M_n$ | $T_m$ |
| PED11k | 10824 | 64.7 | Poly(ω-hydroxy tridecanoate/ω-hydroxy nonanoate) (b) | [—(CH$_2$)$_{12}$—C(=O)O—/ —(CH$_2$)$_8$—C(=O)O—] | 9936 | 68.5 |
| PED6k | 6345 | 62.2 | Poly(propylene succinate) (b) | [—(CH$_2$)$_3$—OC(=O—/ —(CH$_2$)$_2$—C(=O)O—] | 6800 | 58.0 |
| PED5k | 4781 | 60.5 | Polycaprolactone (p) | [—(CH$_2$)$_5$—C(=O)O—] | 5000 | 54.0 |
| PED2k | 2219 | 56.3 | Polyethylene adipate diol (p) | [—(CH$_2$)$_2$—OC(=O—/ —(CH$_2$)$_4$—C(=O)O—] | 2000 | 52.0 |

Number average molecular weight: $M_n$ (gmol$^{-1}$)

To review, polyester diols (PED)s were synthesized by solvent-free melt condensation of azelaic acid and 1,9-nonanediol in the presence of a catalyst. The molecular weight and PDI of the PEDs were controlled effectively, simply by establishing initial and induced stoichiometric imbalance with the diol in excess. $M_n$ and PDI were found to scale predictably with the initial stoichiometric imbalance allowing a very precise control of molecular characteristics of the PEDs. Further induced stoichiometric imbalance at judiciously chosen times during the reaction allowed the arrest of the polymerization at controlled stages and the production of the target $M_n$ within much shorter reaction times. Furthermore, very low and consistent PDI were obtained after adapted fractional purification procedures.

Kinetic analysis of the polymerization conducted with an initial stoichiometric imbalance, revealed three stages of polymerization, each characterized by a different rate constant. The varying rate constants were explained with the changing functional group stoichiometry of reactants during the step-wise polymerization.

The synthetic routes adopted for molecular weight control delivered PEDs with narrowly distributed (PDI, 1.4) molecular weights in the desirable range of $M_n$=2000 to 11000 gmol$^{-1}$. Furthermore, the PEDs were thermally stable and presented well-defined melting properties that can be of great practical importance for the manufacture of thermoplastic poly(ester urethane) elastomers.

The foregoing detailed description and accompanying figures have been provided by way of explanation and illustration, and are not intended to limit the scope of the invention. Many variations in the present embodiments illustrated herein will be apparent to one of ordinary skill in the art, and remain within the scope of the invention and their equivalents.

We claim:

1. A process for preparing an aliphatic polyester diol composition, wherein the process comprises:
   (i) reacting an aliphatic dicarboxylic acid and an aliphatic dial in the presence of a catalyst, wherein the molar ratio of the aliphatic dicarboxylic acid to the aliphatic diol ranges from 1:1.1 to 1:1.75, to provide a crude aliphatic polyester diol composition; and
   (ii) purifying the crude aliphatic polyester dial composition by fractional precipitation to provide a purified aliphatic polyester diol composition.

2. The process of claim 1, wherein the aliphatic dicarboxylic acid comprises a saturated or unsaturated, aliphatic, cycloaliphatic dicarboxylic acid having 2 to 20 carbon atoms.

3. The process of claim 1, wherein the aliphatic dial comprises a saturated or unsaturated, aliphatic, cycloaliphatic diol having 2 to 20 carbon atoms.

4. The process of claim 1, wherein the catalyst is selected from the group consisting of tertiary amines; organometallic derivatives or salts of bismuth, tin, iron, antimony, cobalt, thorium, aluminum, zinc, nickel, cerium, molybdenum, titanium, vanadium, copper, manganese, or zirconium; metal hydroxides; and metal carboxylates.

5. The process of claim 1, wherein the crude aliphatic polyester diol composition comprises aliphatic polyester diols having a weight average molecular weight in a range from 2,100 g/mol to 18,600 g/mol, a number average molecular weight in a range from 1,200 g/mol to 4,800 g/mol, a polydispersity index in a range of 1.7 to 3.9.

6. The process of claim 1, wherein the purified aliphatic polyester diol composition comprises aliphatic polyester diols having a weight average molecular weight in a range from 3,200 g/mol to 18,700 g/mol, a number average molecular weight in a range from 2,200 g/mol to 10,900 g/mol, a polydispersity index in a range of 1.4 to 1.8, a percentage yield of 40 to 73%, and a number average degree of polymerization in a range of 1.5 to 22.

7. The process of claim 1, wherein the purified aliphatic polyester diol composition comprises: (i) an onset temperature of thermal decomposition at 5% weight loss of 193° C. to 277° C.; (ii) a peak decomposition temperature range of 296° C. to 460° C.; and (iii) a percentage weight loss in the temperature range of 296° C. to 460° C. at a decomposition of 8% to 76%.

8. The process of claim 1, wherein the purified aliphatic polyester diol composition comprises: (i) a melting onset temperature in a range of 48.2° C. to 62.3° C., (ii) a peak melting temperature in a range of 56.2° C. to 64.7° C.; and (iii) an enthalpy of melting in a range of 130 J/g to 155 J/g.

9. A process for preparing an aliphatic polyester diol composition, wherein the process comprises:
   (i) reacting an aliphatic dicarboxylic acid and an aliphatic diol in the presence of a catalyst, wherein the diol is added at a beginning of the reaction and at intervals up to seven hours thereafter, and wherein the molar ratio of the aliphatic dicarboxylic acid to the aliphatic diol is 1:1.25 to provide a crude aliphatic diol composition; and
   (ii) purifying the crude aliphatic polyester dial composition by fractional precipitation to provide a purified aliphatic polyester diol composition.

10. The process of claim 9, wherein the aliphatic dicarboxylic acid comprises a saturated or unsaturated, aliphatic, cycloaliphatic dicarboxylic acid having 2 to 20 carbon atoms.

11. The process of claim 9, wherein the aliphatic diol comprises a saturated or unsaturated, aliphatic, cycloaliphatic diol having 2 to 20 carbon atoms.

12. The process of claim 9, wherein the catalyst is selected from the group consisting of tertiary amines; organometallic derivatives or salts of bismuth, tin, iron, antimony, cobalt, thorium, aluminum, zinc, nickel, cerium, molybdenum, titanium, vanadium, copper, manganese, or zirconium; metal hydroxides; and metal carboxylates.

13. The process of claim 9, wherein the crude aliphatic polyester diol composition comprises aliphatic polyester diols having a weight average molecular weight in a range from 3,300 g/mol to 5,700 g/mol, a number average molecular weight in a range from 1,700 g/mol to 2,200 g/mol, a polydispersity index in a range of 1.9 to 2.6.

14. The process of claim 13, wherein the purified aliphatic polyester diol composition comprises aliphatic polyester diols having a weight average molecular weight in a range from 4,400 g/mol to 8,500 g/mol, a number average molecular weight in a range from 3,000 g/mol to 6,000 g/mol, a polydispersity index in a range of 1.4 to 1.5, and a percentage yield in a range of 54% to 77%.

15. The process of claim 9, wherein the purified aliphatic polyester diol composition comprises: (i) an onset temperature of thermal decomposition at 5% weight loss in a range of 207° C. to 214° C.; (ii) a peak decomposition temperature range of 304° C. to 461° C.; and (iii) a percentage weight loss in the temperature range of 304° C. to 461° C. at a decomposition in a range of 9% to 65%.

16. The process of claim 9, wherein the purified aliphatic polyester diol composition comprises: (i) a melting onset temperature in a range of 44.9° C. to 54.2° C., (ii) a peak melting temperature in a range of 59.5° C. to 60.5° C.; and (iii) an enthalpy of melting in a range of 139 J/g to 151 J/g.

17. The process of claim 1, wherein the molar ratio of the aliphatic dicarboxylic acid to the aliphatic diol ranges from 1:1.25 to 1:1.75.

18. The process of claim 1, wherein the aliphatic dicarboxylic acid is azelaic acid.

19. The process of claim 1, wherein the aliphatic diol is 1,9-nonanediol.

20. The process of claim 18, wherein the aliphatic diol is 1,9-nonanediol.

* * * * *